(12) United States Patent
Kawasaki

(10) Patent No.: US 9,541,466 B2
(45) Date of Patent: Jan. 10, 2017

(54) LEAK TEST APPARATUS AND LEAK TEST METHOD

(71) Applicant: So Kawasaki, Toyota (JP)

(72) Inventor: So Kawasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 14/408,688

(22) PCT Filed: Jun. 27, 2013

(86) PCT No.: PCT/IB2013/001362
§ 371 (c)(1),
(2) Date: Dec. 17, 2014

(87) PCT Pub. No.: WO2014/009785
PCT Pub. Date: Jan. 16, 2014

(65) Prior Publication Data
US 2015/0168248 A1    Jun. 18, 2015

(30) Foreign Application Priority Data
Jul. 13, 2012    (JP) .................. 2012-157652

(51) Int. Cl.
G01M 3/34    (2006.01)
G01M 3/02    (2006.01)
G01M 3/32    (2006.01)
G01M 15/02    (2006.01)

(52) U.S. Cl.
CPC .............. *G01M 3/02* (2013.01); *G01M 3/022* (2013.01); *G01M 3/3209* (2013.01); *G01M 15/02* (2013.01)

(58) Field of Classification Search
CPC .... G01M 3/022; G01M 3/3209; G01M 15/02; G01M 3/02; G01M 3/04; G01M 3/146; G01M 3/36; G01M 3/32; G01M 3/3236; G01M 3/24
USPC ................ 73/49.3, 41.2, 45.5, 52, 49.2, 41, 49.8,73/40, 37, 49.4, 715–716
See application file for complete search history.

(56) References Cited

U.S. PATENT DOCUMENTS

| 4,294,107 A | 10/1981 | Walle |
| 4,852,392 A | 8/1989 | Evans |
| 5,939,621 A * | 8/1999 | Myers ..................... G01M 3/10 |
| | | 73/115.02 |

(Continued)

FOREIGN PATENT DOCUMENTS

| CN | 201540188 U | 8/2010 |
| JP | A-59-200939 | 11/1984 |

(Continued)

OTHER PUBLICATIONS

Partial Translation of May 21, 2015 Office Action issued in Japanese Application No. 2012-157652.

*Primary Examiner* — Harshad R Patel
*Assistant Examiner* — Brandi Hopkins
(74) *Attorney, Agent, or Firm* — Oliff PLC

(57) ABSTRACT

A leak test apparatus that tests for a leak in a workpiece includes a plate; a seal that is able to move relative to the plate and is supported by the plate; a driving portion that supports the plate and moves the plate; and a pressure chamber that is surrounded by the plate and the seal. The seal is formed in a shape that enables the pressure chamber to be communicated with an outside.

9 Claims, 17 Drawing Sheets

(56) References Cited

U.S. PATENT DOCUMENTS

| | | | | |
|---|---|---|---|---|
| 6,804,979 B2 * | 10/2004 | Gomez | ................ | B21D 26/045 |
| | | | | 72/61 |
| 2007/0193341 A1 * | 8/2007 | Hoffmann | ............ | F16J 15/3492 |
| | | | | 73/46 |

FOREIGN PATENT DOCUMENTS

| JP | S60-70050 U | 5/1985 |
|---|---|---|
| JP | S60-196640 A | 10/1985 |
| JP | A-4-174334 | 6/1992 |
| JP | H05-203531 A | 8/1993 |
| JP | A-7-310884 | 11/1995 |
| JP | 2001-201425 A | 7/2001 |
| JP | 2002-310843 A | 10/2002 |
| JP | A-2002-328066 | 11/2002 |

\* cited by examiner

F I G. 12A
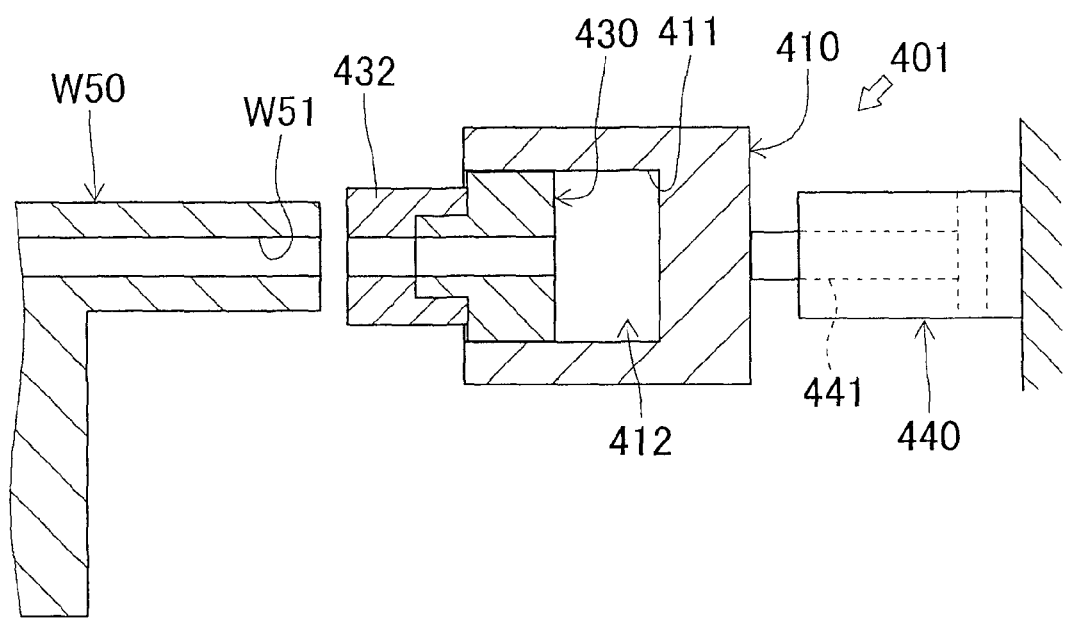
F I G. 12B
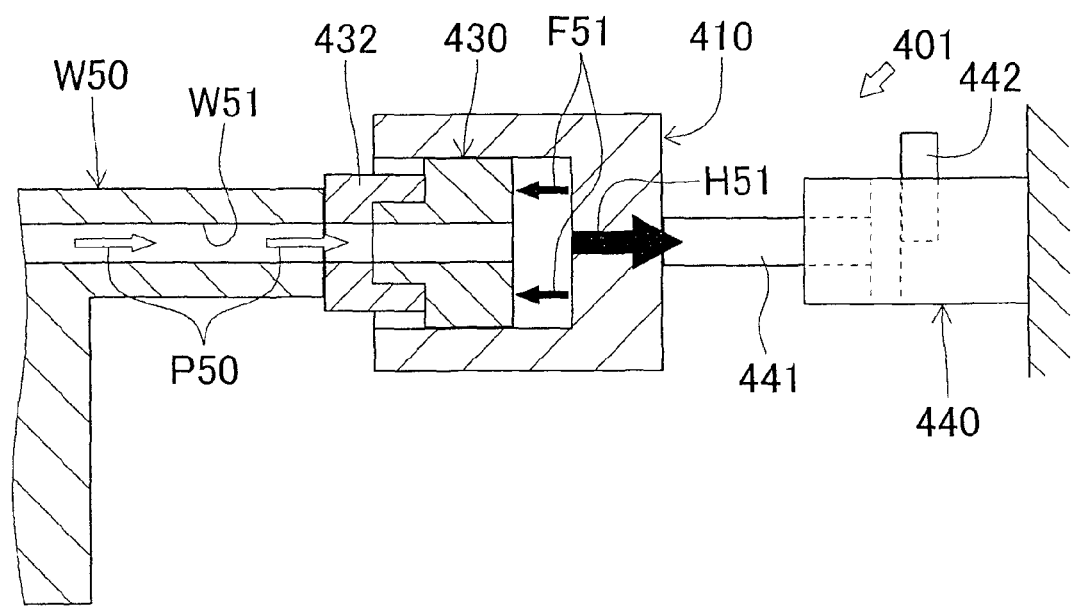

F I G . 1 3
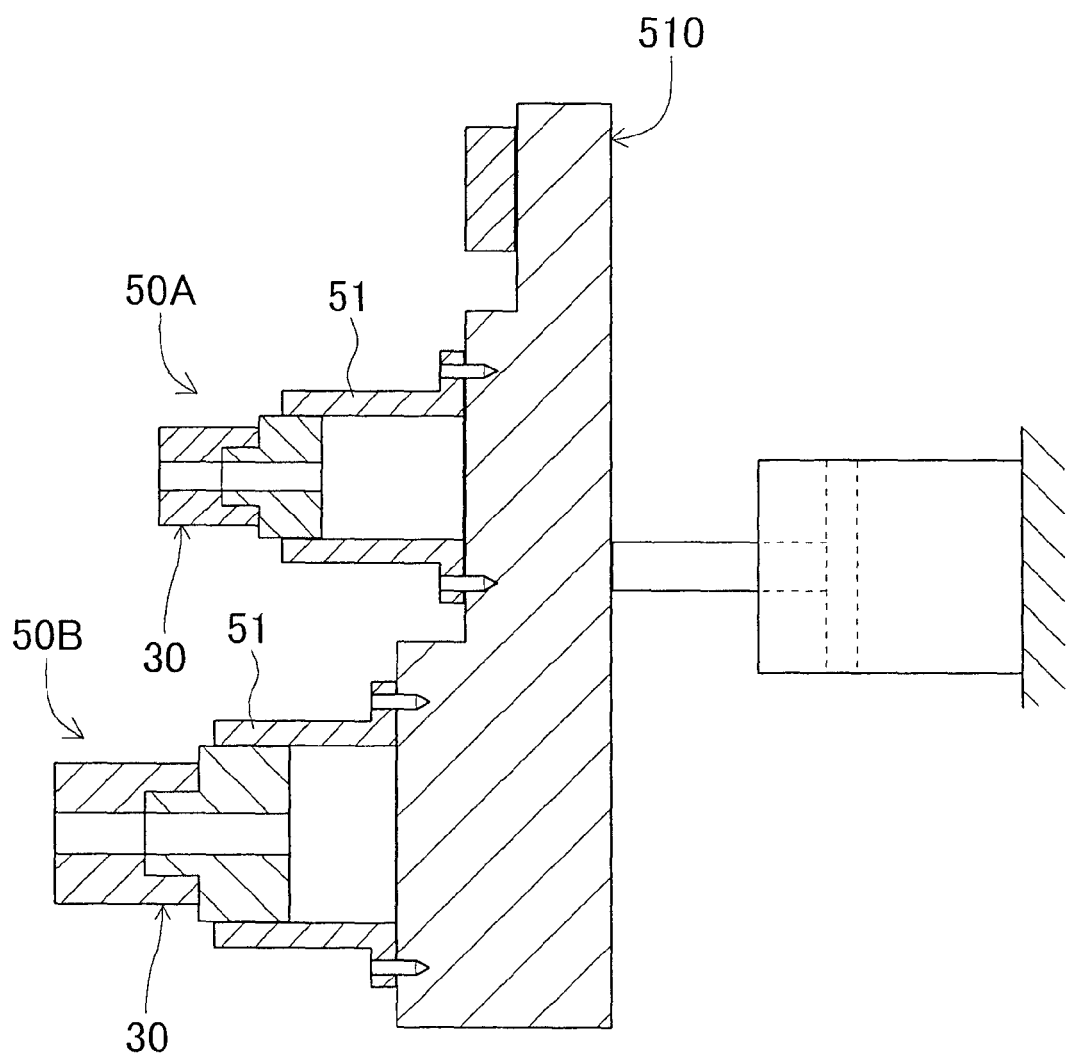

F I G. 15A
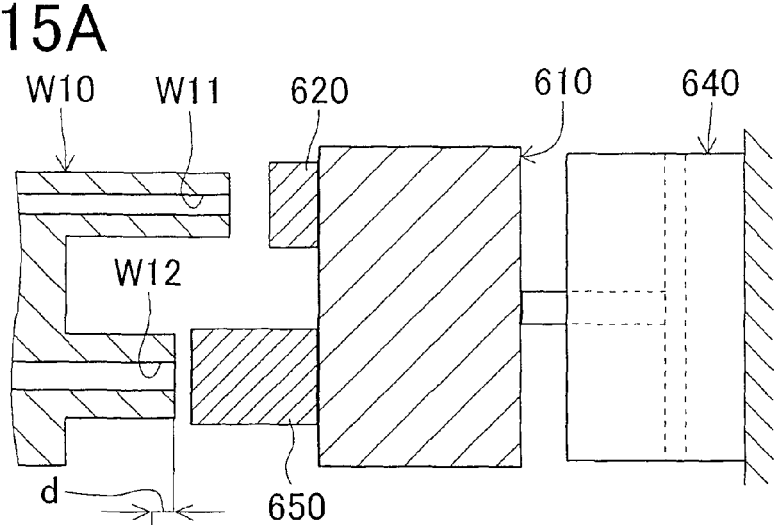
F I G. 15B
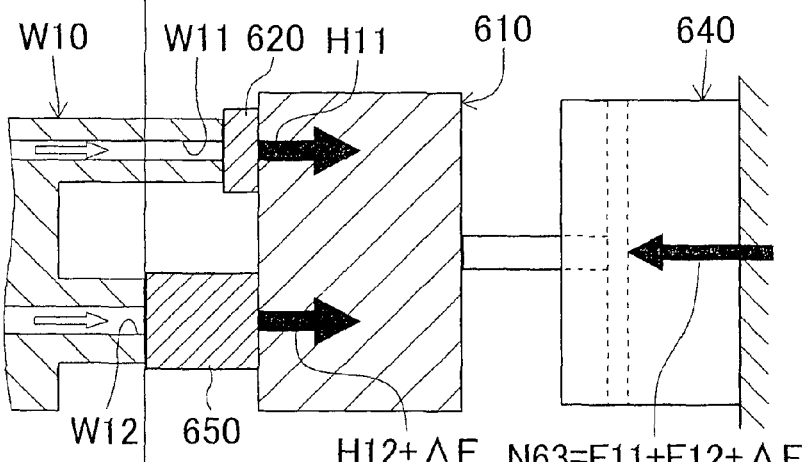
F I G. 15C
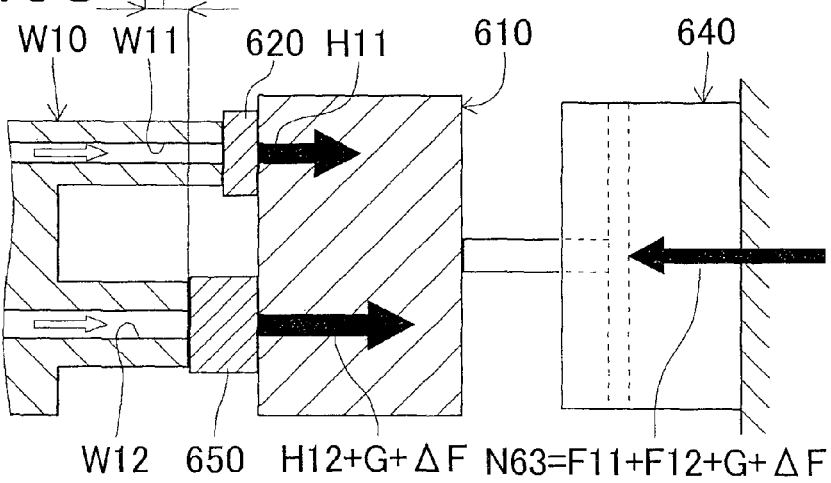

LEAK TEST APPARATUS AND LEAK TEST METHOD

BACKGROUND OF THE INVENTION

1. Field of the Invention

The invention relates to a leak test apparatus and a leak test method that tests for a leak in a workpiece by sealing an open portion formed on one side surface of the workpiece.

2. Description of Related Art

A leak test apparatus that tests for a leak in a workpiece such as a cylinder block by sealing an open portion formed on one side surface of the workpiece is used in an engine production line or the like (see Japanese Patent Application Publication No. 2002-328066 (JP 2002-328066 A), for example). The leak test apparatus described in JP 2002-328066 A is provided with a plurality of masking seals and the like on a movable base that is arranged facing one side surface of a workpiece (i.e., an object to be tested). The movable base is connected to driving means such as a cylinder, and the movable base is able to be extended and retracted with respect to the workpiece. The leak test apparatus described in JP 2002-328066 A moves the movable base close to the workpiece with the driving means, and seals all of the plurality of open portions with the masking seals.

The leak test apparatus described in JP 2002-328066 A brings all of the masking seals into contact with the workpiece and compresses them by driving one of the driving means. Therefore, this leak test apparatus is not able to selectively seal only a desired open portion, from among the plurality of open portions. That is, even if the plurality of open portions is to be tested in order, the driving means must compress the masking seals by generating a large enough amount of thrust to be able to seal the plurality of open portions simultaneously.

Here, as the structure of the masking seals described in JP 2002-328066 A, for example, a fixed rubber member 620 that is fixedly attached to a movable base 610, and a movable rubber member 631 that is attached to the movable base 610 via a spring 630, and the like, as shown in FIG. 14A, are conceivable. In this case, a cylinder 640 brings the fixed rubber member 620 and the movable rubber member 631 (via the spring 630) into contact with the workpiece and compresses them, by generating thrust toward the left (i.e., leftward thrust). Thus, with the thrust generated on the masking seals, the cylinder 640 seals a first open portion W11 formed on an upper side of a workpiece W10, and a second open portion W12 that is arranged in a position below the first open portion W11 and offset by a predetermined length to the left from the first open portion W11.

Hereinafter, the thrust required to seal the first open portion W11 will be designated F11, and the thrust required to seal the second open portion W12 will be designated F12. Also, these thrusts F11 and F12 include reaction force generated during the test.

If the second open portion W12 is farther away from the first open portion W11 side by a tolerance (hereinafter also referred to as "distance") d more than a normal dimension (i.e., the dimension of the second open portion W12 shown in FIG. 14A), the rubber members 620 and 631 will abut against the open portions W11 and W12 at the same time, as shown in FIG. 14B. In this case, the cylinder 640 generates the thrusts F11 and F12 on the masking seals by generating a leftward thrust N61 that is equal to the sum of the thrusts F11+F12, thereby sealing the open portions W11 and W12 (see rightward reaction forces H11 and H12 in FIG. 14B).

On the other hand, if the second open portion W12 is closer to the first open portion W11 side by the distance d more than the normal dimension (i.e., the dimension of the second open portion W12 shown in FIG. 14A), the movable rubber member 631 will abut against the second open portion W12 before the fixed rubber member 620 abuts against the first open portion W11, as shown in FIG. 14C. Therefore, in order to seal the first open portion W11, the spring 630 must be pressed all the way by the leftward thrust of the cylinder 640. When the spring constant of the spring 630 is k, the cylinder 640 must also generate a thrust 2kd to absorb the distance d, in addition to the leftward thrust that is equal to the sum of the thrusts F11+F12 (see thrust N62 in FIG. 14C).

Also, one conceivable structure for sealing the open portions W11 and W12 seals both of the open portions W11 and W12 by fixed rubber members 620 and 650, as shown in FIG. 15A, for example. In this case as well, when the second open portion W12 is closer to the first open portion W11 side by a distance d more than the normal dimension (i.e., the dimension of the second open portion W12 shown in FIG. 15A), the cylinder 640 must generate a thrust G to absorb the distance d (see thrust N64 in FIG. 15C).

Here, as shown in FIG. 16, with the thrust generated by compressing the fixed rubber member 650, the compression amount increases linearly from 0 to a predetermined amount, and then increases nonlinearly beyond this predetermined amount. Also, the rubber members 620 and 650 are compressed, so the compression amount of the fixed rubber member 650 is unable to be determined based on the stroke of the cylinder 640.

That is, with a structure such as that shown in FIG. 15A, the compression amount of the fixed rubber member 650 that is necessary to generated the thrust F12 is unable to be ascertained. In this case, it is necessary to increase the natural length of the fixed rubber member 650 and increase the compression amount to ensure the thrust F12 (extra allowance (i.e., extra length) must be provided). That is, the cylinder 640 must further generate a thrust ΔF to overcome the extra allowance (i.e., the extra length of the fixed rubber member 650) (see thrusts N63 and N64 in FIGS. 15B and 15C).

As described above, the leak test apparatus described in JP 2002-328066 A requires driving means having more thrust than the thrust for sealing the open portion.

SUMMARY OF THE INVENTION

The invention thus provides a leak test apparatus and a leak test method capable of reducing a thrust of a driving portion that is required when sealing an open portion.

A first aspect of the invention relates to a leak test apparatus that tests for a leak in a workpiece by sealing an open portion formed on one side surface of the workpiece. This leak test apparatus includes a plate, a seal that is able to move relative to the plate and is supported by the plate, a driving portion that supports the plate and moves the plate, and a pressure chamber that is surrounded by the plate and the seal. The seal is formed in a shape that enables the pressure chamber to be communicated with an outside.

In this aspect, the plate may be arranged on a side facing the one side surface of a workpiece, and the seal may be able to move relative to the plate in a direction with respect to the workpiece. The seal may also be supported by a side of the plate that faces the one side surface of the workpiece. The driving portion may move the plate and the seal with respect to the workpiece, and the pressure chamber may be configured such that the seal is slidably inserted therein. The seal may be formed in a shape that enables the open portion to be communicated with the pressure chamber. The driving portion may bring the plate toward the workpiece until the seal abuts against the open portion. The pressure chamber may be configured such that test fluid is introduced into the pressure chamber via the seal when the test fluid is introduced into the workpiece. The seal may seal the open portion by being pushed by a pressure of the test fluid from the pressure chamber.

In the aspect described above, a plurality of the open portions may be formed on the one side surface of the workpiece, and the leak test apparatus may seal at least one of the open portions with the seal.

In the aspect described above, at least two open portions in which positions of portions thereof to be sealed differ in a direction with respect to the plate may be formed on the workpiece.

In the aspect described above, the driving portion may be a lock cylinder that is provided with a rod that is connected at one end portion to the plate, and that is able to lock the rod in a predetermined position. Also, the leak test apparatus may seal all of the open portions with the seal.

In the aspect described above, only one of the open portions may be formed on the one side surface of the workpiece, and the driving portion may be a lock cylinder that is provided with a rod that is connected at one end portion to the plate, and that is able to lock the rod in a predetermined position.

A second aspect of the invention relates to a leak test method used by a leak test apparatus that tests for a leak in a workpiece by sealing an open portion formed on one side surface of the workpiece. The leak test apparatus includes a plate that is arranged on a side facing the one side surface of the workpiece; a seal that is able to move relative to the plate in a direction with respect to the workpiece, and is supported by a side of the plate that faces the one side surface of the workpiece; a driving portion that supports the plate and moves the plate and the seal with respect to the workpiece; and a pressure chamber inside of which the seal is slidably inserted, the seal being formed in a shape that enables the open portion of the workpiece to be communicated with the pressure chamber. This leak test method includes driving the driving portion; bringing the plate toward the workpiece until the seal abuts against the open portion; introducing test fluid into the pressure chamber via the seal when the test fluid is introduced into the workpiece; and pushing the seal with a pressure of the test fluid from the pressure chamber.

The aspects described above display the effect of being able to reduce the thrust of a driving portion that is required when sealing an open portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12A is a view of a state before one of the open portions is sealed by the leak test apparatus according to the fifth example embodiment of the invention;

FIG. 12B is a view of a state in which one of the open portions is being sealed by the leak test apparatus according to the fifth example embodiment of the invention;

FIG. 13 is a view related to the unitization of a leak test apparatus according to another example embodiment of the invention;

FIG. 15A is a sectional view of the structure when open portions are sealed by a fixed rubber member according to related art, and shows the second open portion with no tolerance;

FIG. 15B is a sectional view of the structure when the open portions are sealed by the spring according to related art, and shows the second open portion separated from the first open portion by the amount of the tolerance;

FIG. 15C is a sectional view of the structure when the open portions are sealed by the spring according to related art, and shows the second open portion closer to the first open portion by the amount of the tolerance;

DETAILED DESCRIPTION OF EMBODIMENTS

Figure 1A:
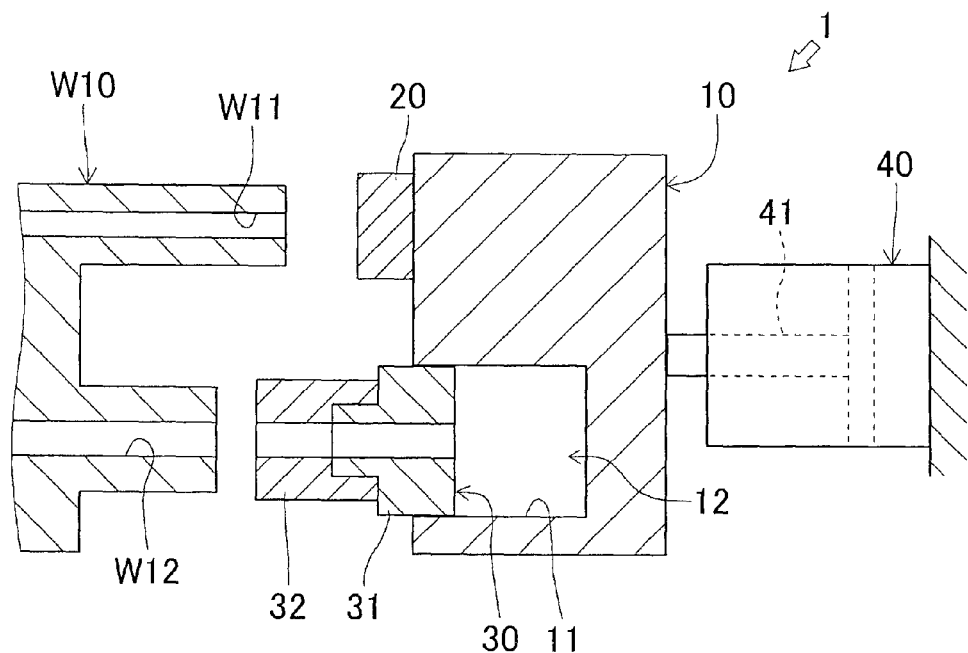
FIG. 1A is a sectional view of the overall structure of a leak test apparatus according to a first example embodiment of the invention.

A leak test apparatus according to example embodiments of the invention will now be described. To simplify the description, the example embodiments of the invention will be described with the directions (i.e., up, down, left, and right) with respect to the leak test apparatus matching the directions (i.e., up, down, left, and right, respectively) in the drawings.

The leak test apparatus according to the example embodiments is an apparatus for testing for a leak in a workpiece by sealing an open portion formed on one side surface of the workpiece.

In this example embodiments, the workpiece is a cylinder block, but the workpiece is not limited to this. Also, the leak test apparatus is an apparatus that is arranged in an engine production line.

Figure 4:
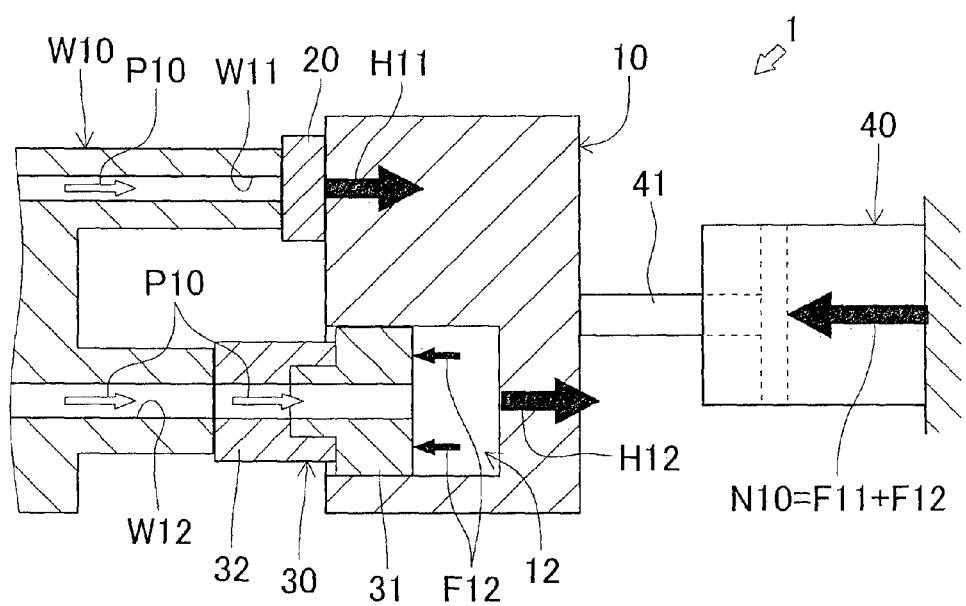
FIG. 4 is a view of a state in which open portions in the first example embodiment of the invention are sealed.

A leak test apparatus 1 in a first example embodiment is an apparatus for sealing a first open portion W11 and a second open portion W12 formed on a right side surface of a workpiece W10 (see FIG. 4).

First, the open portion W11 and W12 will be described.

As shown in FIG. 1A, the first open portion W11 is a portion that opens to the outside of the workpiece W10, at a tip end portion of a portion that protrudes to the right of a right side surface of the workpiece W10.

The second open portion W12 is a portion that opens to the outside of the workpiece W10, at a tip end portion of a portion that protrudes to the right of a portion below the first open portion W11 on the right side surface of the workpiece W10. The second open portion W12 is arranged farther to the left than the first open portion W11. That is, the second open portion W12 is arranged in a position offset by a predetermined length farther to the left than the first open portion W11.

In this way, at least the two open portions W11 and W12 in which the positions of portions thereof to be sealed (i.e., right end portions of the protruding portions) differ in the left-right direction are formed on the workpiece W10 of the first example embodiment.

The open portions W11 and W12 are communicated together inside of a cylinder block. Therefore, the open portions W11 and W12 are simultaneously sealed when the test is performed.

Next, the structure of the leak test apparatus 1 according to the first example embodiment will be described.

The leak test apparatus 1 includes a plate 10, a fixed rubber member 20, a sliding unit 30, and a cylinder 40.

The plate 10 is arranged to the right of the workpiece W10. That is, the plate 10 is arranged on a side facing the right side surface of the workpiece W10. The plate 10 is formed in a shape in which part of a left side surface of a generally rectangular parallelepiped member is cutout. The cutout portion of the plate 10 is formed as a recessed portion 11.

The recessed portion 11 is a depression that is formed in a generally circular shape when viewed from a position facing the left side surface thereof. The recessed portion 11 is provided from the left side surface of the plate 10 toward the right side of the plate 10.

The fixed rubber member 20 is fixed to an upper side (i.e., above the recessed portion) of the left side surface of the plate 10. The first open portion W11 is positioned to the left of the fixed rubber member 20. The fixed rubber member 20 is formed in a shape that is able to seal the first open portion W11 by the fixed rubber member 20 being compressed. For example, the fixed rubber member 20 is formed in generally the same shape (i.e., generally ring-shaped) as the first open portion W11 or generally a disk-shape having an outer diameter dimension that is larger than an inner diameter dimension of the first open portion W11.

The sliding unit 30 that serves sealing means is arranged on a lower side (i.e., below of the fixed rubber member 20) of the left side surface of the plate 10. The second open portion W12 is positioned to the left of the sliding unit 30. The sliding unit 30 includes a sliding member 31 and a seal member 32.

The sliding member 31 is arranged on the right side of the sliding unit 30. As shown in FIG. 1A, the sliding member 31 is a generally cylindrical member in which the outer diameter dimension of the left side portion is different from the outer diameter dimension of the right side portion. The outer diameter of the right side portion of the sliding member 31 is formed larger than the outer diameter of the left side portion. The outer diameter dimension of the right side portion of the sliding member 31 is set to be substantially the same as the inner diameter dimension of the recessed portion 11. The inner diameter dimension of the sliding member 31 is set to be substantially the same as the inner diameter dimension of the second open portion W12.

An O-ring is attached to an outer peripheral surface of a right side portion of the sliding member 31, and the sliding member 31 is slidably inserted into the recessed portion 11. A predetermined gap (space) is formed between the sliding member 31 and a bottom portion (i.e., the right side portion) of the recessed portion 11.

Therefore, the leak test apparatus 1 is configured such that a test fluid P10 (see FIG. 4) such as air can be filled into the gap (space) provided between the recessed portion 11 and the sliding member 31.

In this first example embodiment, the gap (space) is formed as a pressure chamber 12 into which the sliding member 31 is able to be slidably inserted. Also, the sliding unit 30 is supported so as to be able to move in the left-right direction (i.e., a direction with respect to the workpiece W10). That is, the sliding unit 30 is supported by the left side surface of the plate 10 (i.e., the side facing the right side surface of the workpiece W10), in a manner so as to be able to move relative to the plate 10.

The means for forming the pressure chamber is not limited to that described in this first example embodiment. That is, the leak test apparatus may also be such that a sliding unit is slidably inserted into a generally cylindrical connecting member that is attached to a plate, and a space surrounded by the plate, the connecting member, and the sliding unit is formed as a pressure chamber (see the sliding unit 30, connecting member 51, and plate 510 in FIG. 13).

The seal member 32 is arranged on the left side of the sliding unit 30. The seal member 32 is a generally cylindrical member in which the inner diameter dimension of the left side portion is different from the inner diameter dimension of the right side portion. The inner diameter of the right side portion of the seal member 32 is formed larger than the inner diameter of the left side portion. The left side portion of the sliding member 31 is inserted into the right side portion of the seal member 32, and the internal space of the seal member 32 is communicated with the internal space of the sliding member 31. The seal member 32 is formed by an elastic body such as rubber. A left end portion of the seal member 32 is formed in a shape that is able to seal the second open portion W12 by being compressed. For example, the left end portion of the seal member 32 is formed in generally the same shape as the second open portion W12.

In this way, the sliding unit 30 is formed in a shape that enables the second open portion W12 to be communicated with the pressure chamber 12 on the inside when the sliding unit 30 abuts against the second open portion W12.

The sliding unit may be such that the sliding member and the seal member are integrally formed. Also, the shape of the inside of the sliding unit is not limited to the shape described in this first example embodiment, as long as the shape is such that the second open portion is able to be communicated with the pressure chamber on the inside.

The cylinder 40 that serves as a driving portion is arranged to the right of the plate 10, and is supported by a predetermined case. The cylinder 40 includes a rod 41 that protrudes from the left side thereof. The cylinder 40 supports the plate 10 by a left end portion of the rod 41 being connected to a right side surface of the plate 10. That is, the plate 10 and the sliding unit 30 configured to be able to move with respect to the workpiece W10 by an extending and retracting operation of the rod 41 of the cylinder 40.

When the plate 10 is brought close to the workpiece W10, the position in which the sliding unit 30 is arranged is adjusted such that the seal member 32 will abut against the second open portion W12 before the fixed rubber member 20 abuts against the first open portion W11.

Next, the operation of the leak test apparatus 1 according to the first example embodiment will be described.

Hereinafter, thrust necessary to seal the first open portion W11 will be designated F11, and thrust necessary to seal the second open portion W12 will be designated F12. Also, the thrusts F11 and F12 include reaction force generated during the test.

Figure 2:
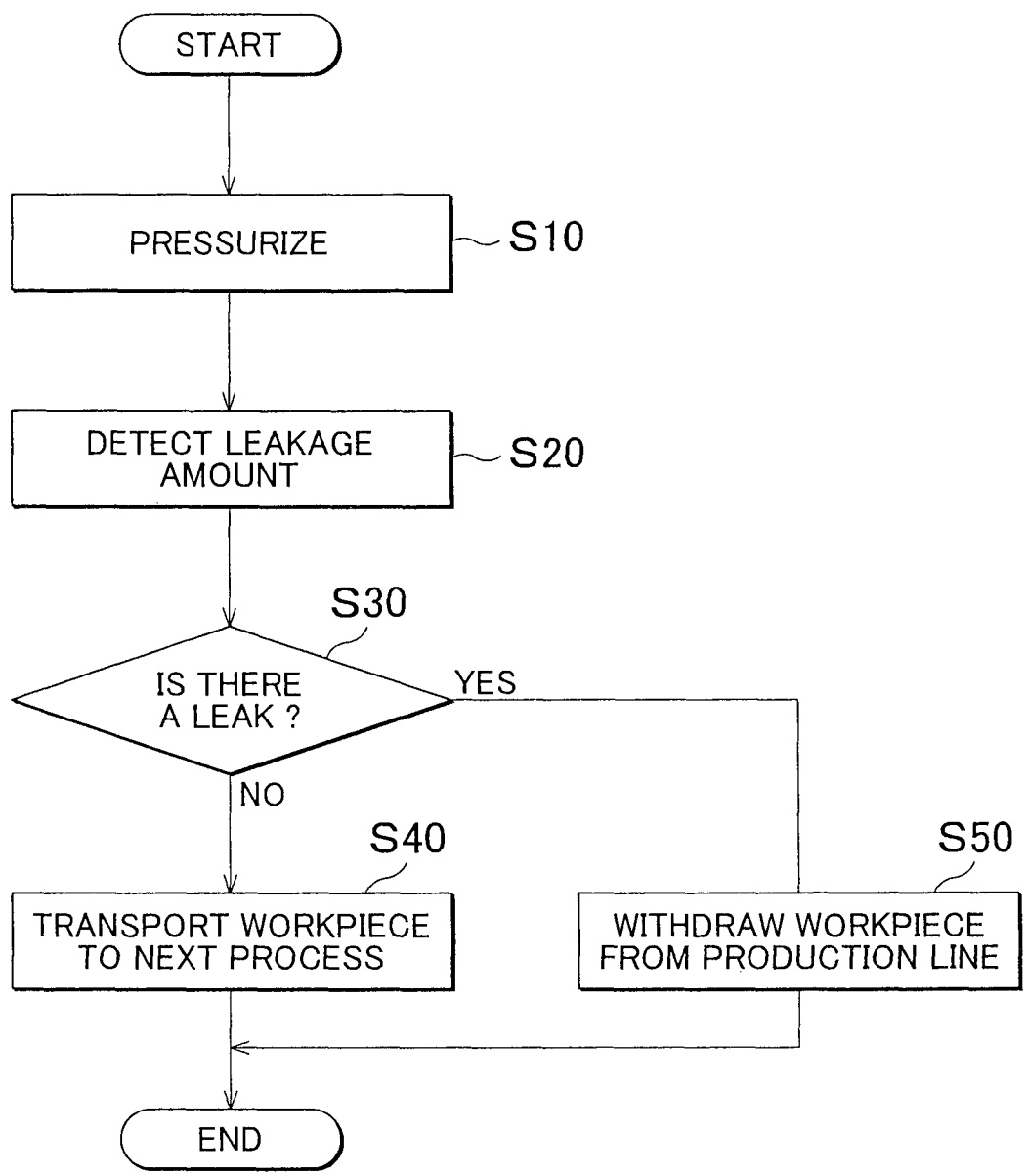
FIG. 2 is a flowchart illustrating a leak test routine according to the first example embodiment of the invention.

First, the leak test apparatus 1 pressurizes the workpiece W10 that is transported by the production line, as shown in FIG. 2 (S10).

Figure 3A:
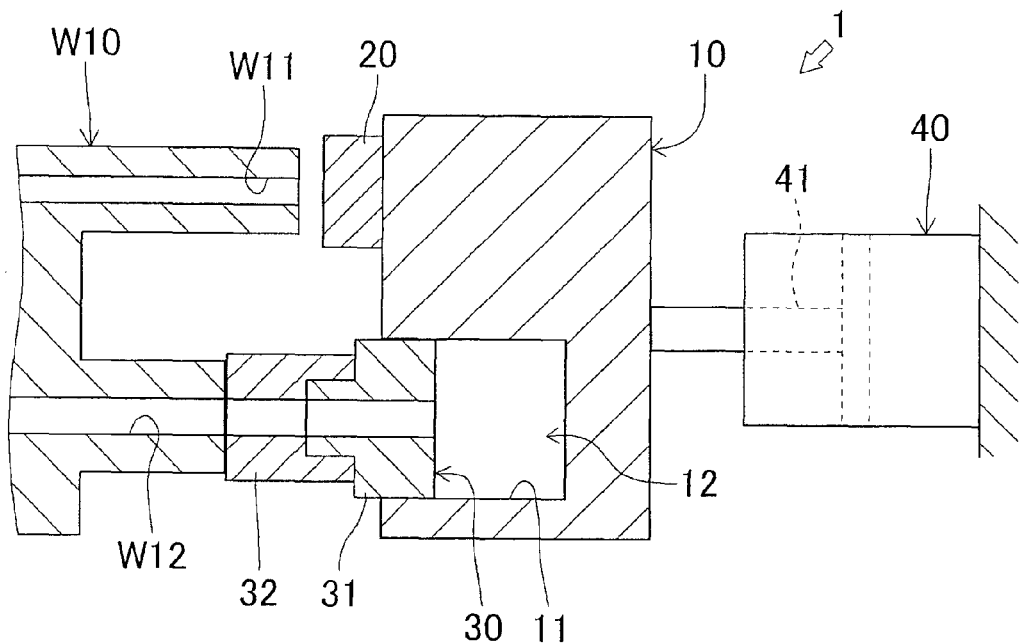
FIG. 3A is a view of the operation of the leak test apparatus according to the first example embodiment of the invention, before the leak test apparatus is moved.

That is, the leak test apparatus 1 brings the plate 10 close to the workpiece W10 by driving the cylinder 40 (generating leftward thrust), as shown in FIG. 3A. At this time, the seal member 32 abuts against the second open portion W12 before the fixed rubber member 20 abuts against the first open portion W11.

Figure 3B:
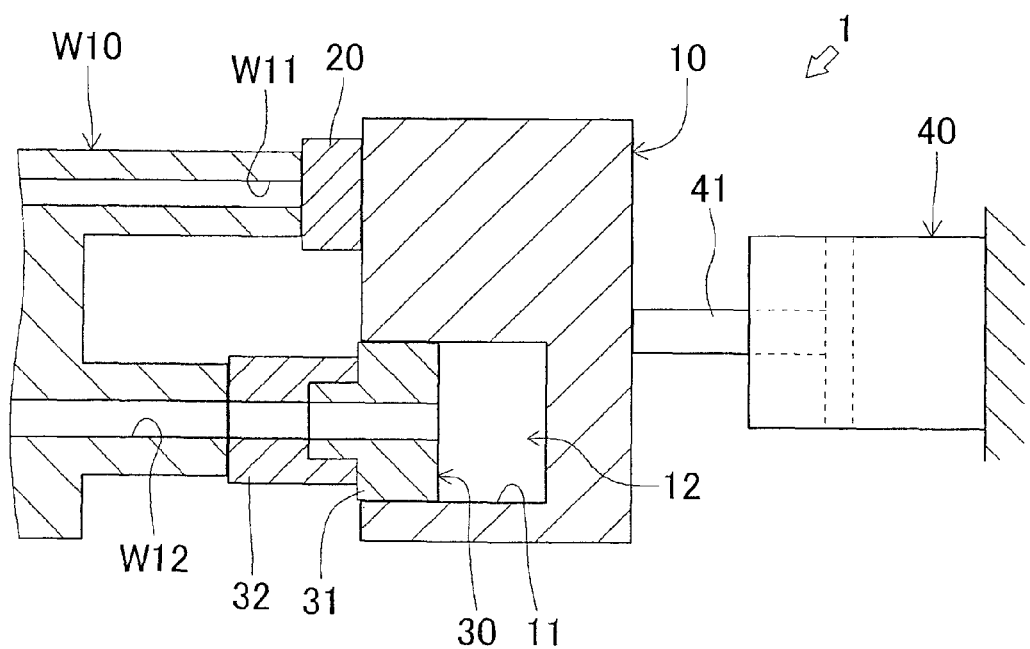
FIG. 3B is a view of the operation of the leak test apparatus according to the first example embodiment of the invention, after the leak test apparatus is moved.

Then, as shown in FIG. 3B, the leak test apparatus 1 brings the plate 10 even closer to the workpiece W10 such that the fixed rubber member 20 abuts against the first open portion W11. At this time, the sliding unit 30 is already abutting against the second open portion W12, so the recessed portion 11 slides a predetermined amount to the right.

As a result, the leak test apparatus 1 abuts the fixed rubber member 20 against the first open portion W11, and abuts the seal member 32 of the sliding unit 30 against the second open portion W12.

After the plate 10 has been brought close, the test fluid P10 is introduced into the workpiece W10, as shown in FIG. 4.

At this time, the second open portion W12 is communicated with the pressure chamber 12, so the test fluid P10 is also introduced into the pressure chamber 12 via the sliding unit 30. Also, the cylinder 40 supports the plate 10 such that the plate 10 does not move to the right by generating leftward thrust. Accordingly, the sliding unit 30 is pushed to the left, such that the seal member 32 presses against the second open portion W12.

In this way, the leak test apparatus 1 compresses the seal member 32 and seals the second open portion W12 by pushing the sliding unit 30 to the left with the pressure from the pressure chamber 12.

Figure 1B:
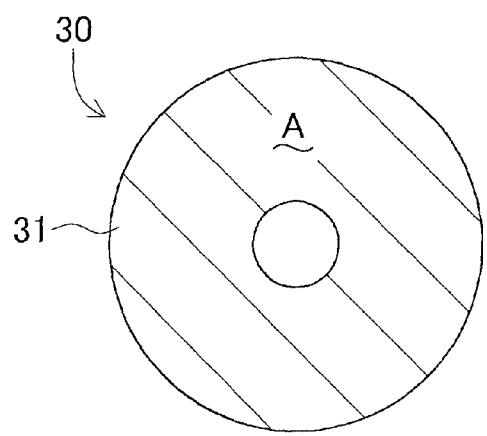
FIG. 1B is a sectional view of the leak test apparatus according to the first example embodiment of the invention, and shows a pressure receiving area of a sliding unit in the leak test apparatus.

Here, the force that pushes the sliding unit 30 is determined by the product of a pressure receiving area A of the sliding unit 30 (i.e., the area of the right side surface of the sliding member 31 (see FIG. 1B)) and the pressure of the test fluid P10. Also, the pressure of the test fluid P10 is set to a predetermined amount according to testing.

Therefore, the leak test apparatus 1 sets the result (i.e., the quotient) of dividing the thrust F12 for sealing the second open portion W12 by the pressure of the test fluid P10 as the pressure receiving area A of the sliding unit 30. Therefore, when the test fluid P10 is introduced, the leak test apparatus 1 is able to compress the seal member 32 to an extent whereby the thrust F12 is generated. That is, the leak test apparatus 1 is able to seal the pressure chamber 12 with the optimum force.

Also, when the test fluid P10 is introduced, the cylinder 40 generates leftward thrust to compress the fixed rubber member 20, and seals the first open portion W11 with this thrust. As described above, the leak test apparatus 1 seals the second open portion W12 by generating the thrust F12. That is, the rightward reaction force that acts on the plate 10 when sealing the second open portion W12 is equal to the thrust F12 (see rightward reaction force H12 in FIG. 4).

Therefore, the cylinder 40 is able to compress the fixed rubber member 20 to an extent whereby the thrust F11 is generated, simply by generating leftward thrust N10 that is equal to the sum of the thrusts F11+F12 (see rightward reaction force H11 in FIG. 4).

The leak test apparatus 1 in this way seals the open portions W11 and W12, and pressurizes the workpiece W10.

After pressurizing the workpiece W10, the leak test apparatus 1 detects a leakage amount of the workpiece W10 with a predetermined detecting device, as shown in FIG. 2 (S20).

After detecting the leakage amount of the workpiece W10, the leak test apparatus 1 determines whether there is a leak in the workpiece W10 based on the leakage amount of the workpiece W10 (S30).

If the leakage amount of the workpiece W10 is equal to or less than a predetermined threshold, the leak test apparatus 1 determines that there is no leak in the workpiece W10. In this case, the leak test apparatus 1 drives the cylinder 40 to move the plate 10 away from the workpiece W10, and transports the workpiece W10 on to the next process (i.e., NO in S30; S40).

On the other hand, if the leakage amount of the workpiece W10 exceeds the predetermined threshold value, the leak test apparatus 1 determines that there is a leak in the workpiece W10. In this case, the leak test apparatus 1 drives the cylinder 40 to move the plate 10 away from the workpiece W10, and withdraws the workpiece W10 from the production line as an NG workpiece (i.e., YES in S30; S50). That is, the leak test apparatus 1 does not transport the workpiece W10 on to the next process.

The leak test apparatus 1 continuously inspects the workpiece W10 for leaks in the production line by performing these steps S10 to S50.

A spring that urges the sliding unit 30 to the left is attached to the sliding unit 30. More specifically, one end portion of the spring is attached to the bottom portion of the recessed portion 11 (i.e., the surface on the cylinder 40 side), and the other end portion of the spring is attached to the right side surface of the sliding member 31. Therefore, when the plate 10 is separated from the workpiece W10, the sliding unit 30 is urged to the left by the spring and returned to a predetermined position (i.e., the position shown in FIG. 1A).

Figure 5A:
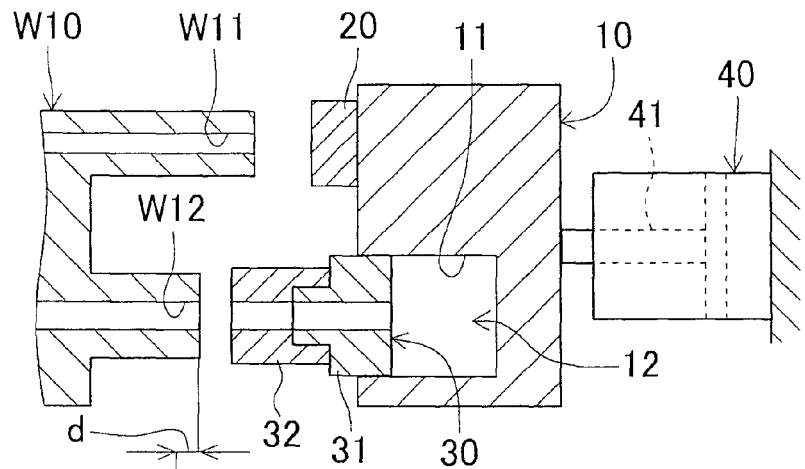
FIG. 5A is a view of a state in which a tolerance of a second open portion with respect to a first open portion in the first example embodiment of the invention is absorbed, and shows the second open portion with no tolerance.
Figure 5B:
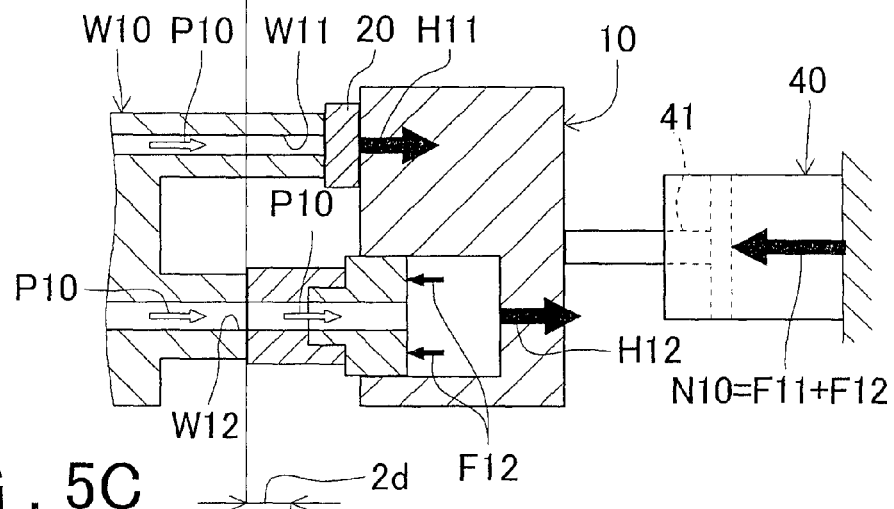
FIG. 5B is a view of a state in which the tolerance of the second open portion with respect to the first open portion in the first example embodiment of the invention is absorbed, and shows the second open portion separated from the first open portion.

Here, for example, when the second open portion W12 is separated from the first open portion W11 side by a distance d more than a normal dimension (i.e., the dimension of the second open portion W12 shown in FIG. 5A), the second open portion W12 will be farthest from the sliding unit 30, as shown in FIGS. 5A and 5B.

In such a case, when the plate 10 is brought close, the seal member 32 will abut against the second open portion W12 at a relatively late stage. Therefore, the sliding amount of the sliding unit 30 is reduced by this distance d (see arrow d in FIGS. 5A and 5B).

Figure 5C:
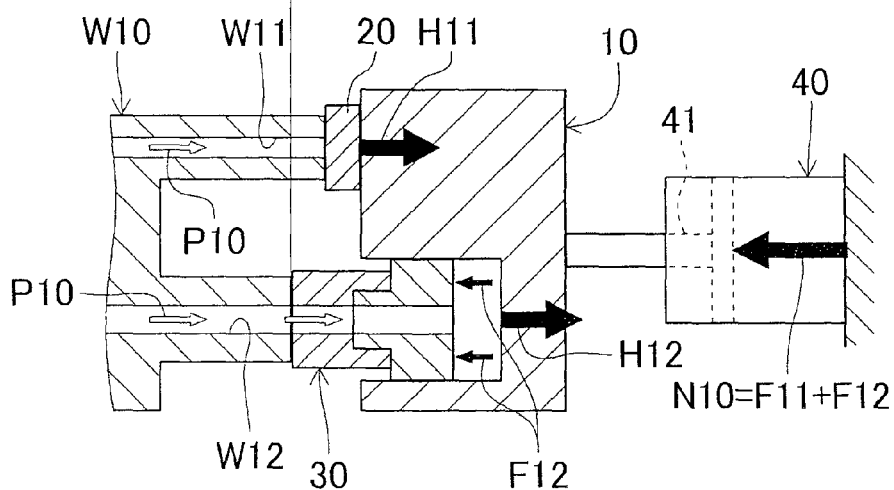
FIG. 5C is a view of a state in which the tolerance of the second open portion with respect to the first open portion in the first example embodiment of the invention is absorbed, and shows the second open portion close to the first open portion.

On the other hand, as shown in FIG. 5C, when the second open portion W12 is closer to the first open portion W11 side by the distance d more than the normal dimension (i.e., the dimension of the second open portion W12 shown in FIG. 5A), the seal member 32 will abut against the second open portion W12 at a relatively early stage. Therefore, the sliding amount of the sliding unit 30 is increased by the distance d (see arrow 2d in FIGS. 5B and 5C).

As described above, the force that pushes the sliding unit 30 is determined by the pressure of the test fluid P10 and the pressure receiving area A. Therefore, the leak test apparatus 1 compresses the seal member 32 to an extent whereby the thrust F12 is generated (see the thrust F12 in FIGS. 5B and 5C) when the test fluid P10 is introduced into the workpiece W10, regardless of the distance d of the second open portion W12 (i.e., the sliding amount of the sliding unit 30).

Also, the fixed rubber member 20 is abutting against the first open portion W11 in the same way, regardless of the distance d of the second open portion W12. Therefore, the leak test apparatus 1 does not need to generate a large leftward thrust and push the seal member 32 all the way in order to generate the thrust F11.

Therefore, the cylinder 40 is able to seal the open portions W11 and W12 (see the rightward reaction forces H11 and H12 in FIGS. 5B and 5C) simply by generating rightward thrust N10 that is equal to the sum of the thrusts F11+F12, regardless of the distance d of the second open portion W12.

In this way, when the leak test apparatus 1 seals the open portions W11 and W12 in which the positions of the portions of the workpiece W10 that are to be sealed are different in the left-right direction, the distance d of the second open portion W12 is able to be absorbed by the sliding amount of the sliding unit 30. Therefore, the cylinder 40 is able to do away with the thrust for absorbing the distance d such as that in the related art (see thrust N62 in FIG. 14C and thrust N64 in FIG. 15C).

Also, the leak test apparatus 1 is able to constantly compress the seal member 32 with force according to the pressure receiving area A of the sliding unit 30 and the pressure of the test fluid P10. That is, the leak test apparatus 1 is able to constantly generate the thrust F12 and seal the second open portion W12. Therefore, the leak test apparatus 1 does not need to take the compression characteristic of the seal member 32 into account, so thrust ΔF to overcome the extra allowance (i.e., the extra length of the rubber member) such as that in the related art (see FIGS. 15A, 15B, 15C, and 16) is able to be done away with.

That is, the leak test apparatus 1 is able to reduce the thrust of the cylinder 40 that is required when sealing an open portion. Therefore, with the leak test apparatus 1, the cylinder 40 and the case that supports the cylinder 40 are able to be made smaller, so the cost is able to be reduced.

Accordingly, the leak test apparatus 1 is able to inhibit an excessive load from being placed on the fixed rubber member 20 and the seal member 32. Therefore, with the leak test apparatus 1, deterioration of the fixed rubber member 20 and the seal member 32 is able to be suppressed, so leaking caused by such deterioration is able to be suppressed.

Further, even if permanent deformation occurs in the fixed rubber member 20 and the seal member 32 due to continued use, the leak test apparatus 1 is able to accommodate a fluctuation in the compression amount due to the permanent deformation, by the sliding amount of the sliding unit 30. Therefore, even if permanent deformation occurs in the fixed rubber member 20 and the seal member 32, the cylinder 40 is able to seal the open portions W11 and W12 simply by generating the leftward thrust N10 that is equal to the sum of the thrusts F11+F12.

Thus, the leak test apparatus 1 is able to stably seal the open portions W11 and W12, as well as reduce the frequency with which the fixed rubber member 20 and the seal member 32 are replaced.

Figure 17:
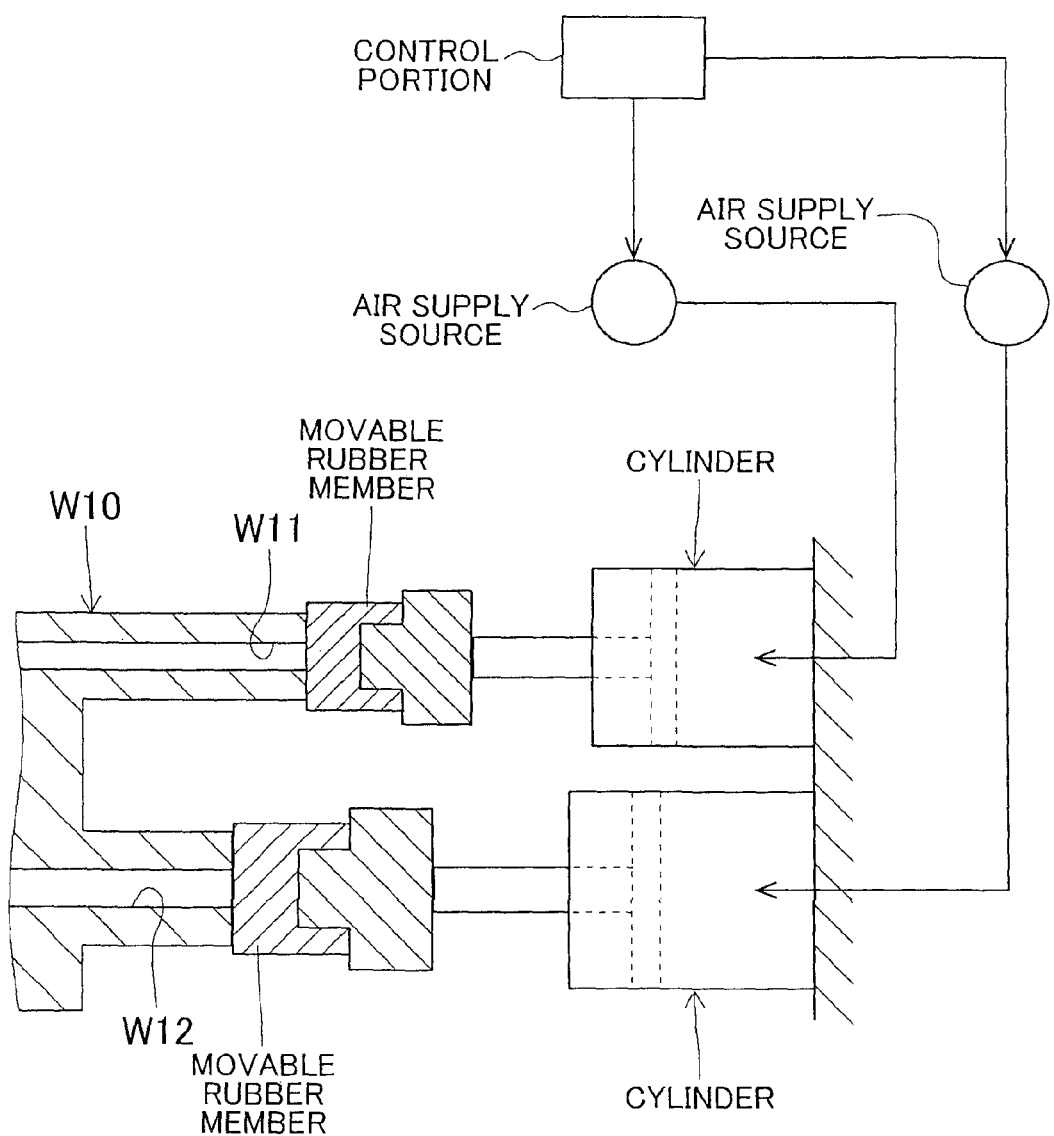
FIG. 17 is a view of a state in which the open portions are sealed using individual cylinders, according to related art.

Here, in order to absorb the distance d of the second open portion W12, a structure that individually seals the open portions W11 and W12 using two cylinders, as shown in FIG. 17, is conceivable. In this kind of structure, two air supply sources are controlled by a control portion, two movable rubber members are compressed by driving the cylinders individually, and the open portions W11 and W12 are sealed with this thrust. In this case, the control that controls the cylinders, and the two air supply sources that supply air to the cylinders, end up being necessary.

On the other hand, the leak test apparatus 1 is able to seal the open portions W11 and W12 with the one cylinder 40, as shown in FIG. 4. Therefore, the leak test apparatus 1 is able to simplify the structure and reduce the cost, compared with when the open portions W11 and W12 are sealed using individual cylinders.

The leak test apparatus 1 may also seal the first open portion with a sliding unit, and seal the second open portion with a fixed rubber member. That is, in the leak test apparatus 1, only one of the open portions needs to be sealed by the sliding unit.

Next, a leak test apparatus 101 according to a second example embodiment of the invention will be described.

Figure 6:
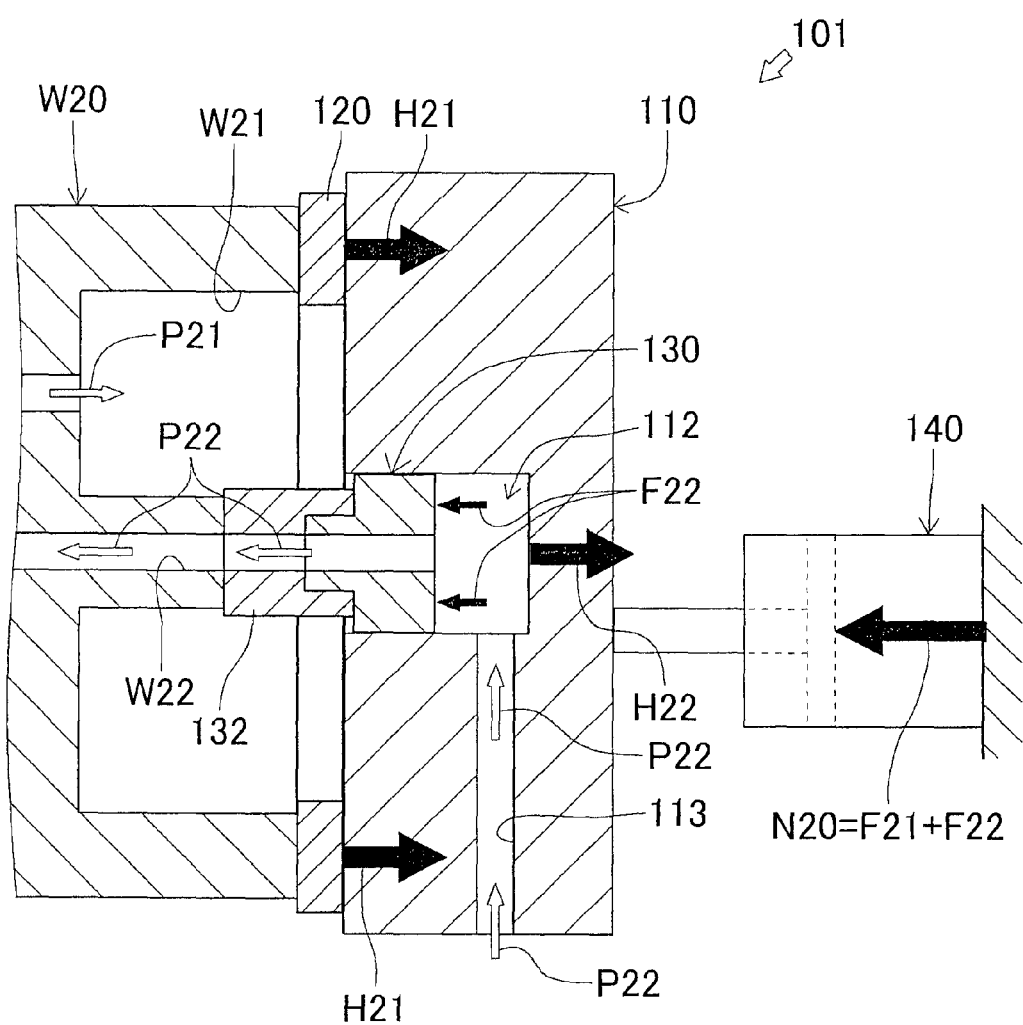
FIG. 6 is a view of the operation of a leak test apparatus according to a second example embodiment of the invention.

As shown in FIG. 6, the leak test apparatus 101 according to the second example embodiment differs from the leak test apparatus 1 according to the first example embodiment in that an outer open portion W21 and an inner open portion W22 that is formed inside the outer open portion W21 are sealed, and a test fluid P22 is introduced into a workpiece W20 from the inside open portion W22.

The open portions W21 and W22 are formed in generally circular shapes when viewed from a position facing the right side surface of the workpiece W20. The inner open portion W22 is arranged offset by a predetermined length to the left of the outer open portion W21. The inner open portion W22 is formed in generally the same shape as the second open portion W12 in the first example embodiment.

These kinds of open portions W21 and W22 are not communicated together inside the cylinder block. That is, the open portions W21 and W22 are separate systems. Also, the leak test apparatus 101 simultaneously detects a leak in the systems corresponding to the open portions W21 and W22.

The leak test apparatus 101 according to the second example embodiment seals the outer open portion W21 with a fixed rubber member 120, and seals the inner open portion W22 with a sliding unit 130.

The fixed rubber member 120 is configured similar to the fixed rubber member 20 of the first example embodiment, except for that it is formed in a general ring-shape so as to be able to seal the outer open portion W21.

The sliding unit 130 is configured similar to the sliding unit 30 of the first example embodiment.

A communication hole 113 that leads from a lower surface of a plate 110 to a pressure chamber 112, is formed in the plate 110. Also, the leak test apparatus 101 is configured to enable the test fluid P22 to be introduced into the plate 110 via a conduit that is connected to the communication hole 113.

Next, the operation of the leak test apparatus 101 according to the second example embodiment will be described.

Hereinafter, thrust necessary to seal the outer open portion W21 will be designated F21, and thrust necessary to seal the inner open portion W22 will be designated F22. Also, the thrusts F21 and F22 include reaction force generated during the test.

The leak test apparatus 101 drives a cylinder 140 to bring the plate 110 close to the workpiece W20, such that the fixed rubber member 120 and a seal member 132 abut against the open portions W21 and W22. Then, the leak test apparatus 101 introduces the test fluid P22 into the communication hole 113. The test fluid P22 is introduced into the inner open portion W22 through the communication hole 113, the pressure chamber 112, and the inside of the sliding unit 130, in this order. At the same time, test fluid P21 is introduced into the system corresponding to the outer open portion W21. At this time, the cylinder 140 supports the plate 110 such that the plate 110 will not move to the right by generating leftward thrust, and compresses the fixed rubber member 120, thereby sealing the outer open portion W21 (see rightward reaction forces H21 and H22 in FIG. 6).

As a result, in the leak test apparatus 101, the sliding unit 130 is pushed to the left by the pressure of the test fluid P22 from the pressure chamber 112 (see thrust F22 in FIG. 6), while the pressure chamber 112 functions as an inlet for the test fluid P22 that is introduced into the inner open portion W22. In this way, the leak test apparatus 101 compresses the seal member 132, and seals the inner open portion W22 with this thrust F22.

In this way, the sliding unit 130 is able to seal the inner open portion W22 into which the test fluid P22 is introduced. Also, the distance of the inner open portion W22 with respect to the outer open portion W21 is able to be absorbed by the sliding amount of the sliding unit 130, so the cylinder 140 is able to seal the outer open portion W21 by only generating leftward thrust N20 that is equal to the sum of the thrusts F21+F22, regardless of this distance (see rightward reaction force H21 in FIG. 6).

Figure 14A:
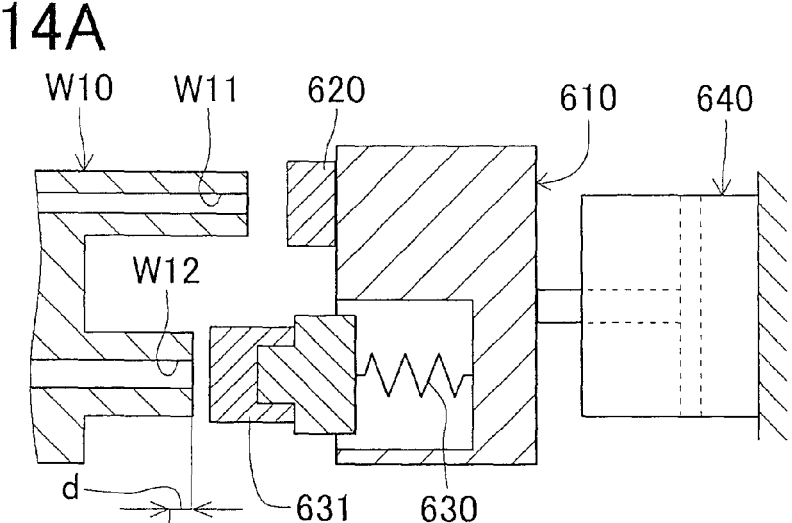
FIG. 14A is a sectional view of the structure when a second open portion is sealed by a spring according to related art, and shows the second open portion with no tolerance.
Figure 14B:
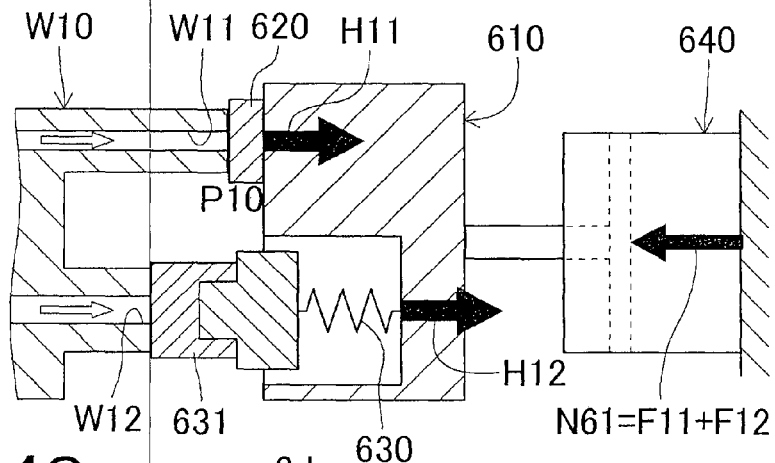
FIG. 14B is a sectional view of the structure when the second open portion is sealed by the spring according to related art, and shows the second open portion separated from a first open portion by the amount of the tolerance.
Figure 14C:
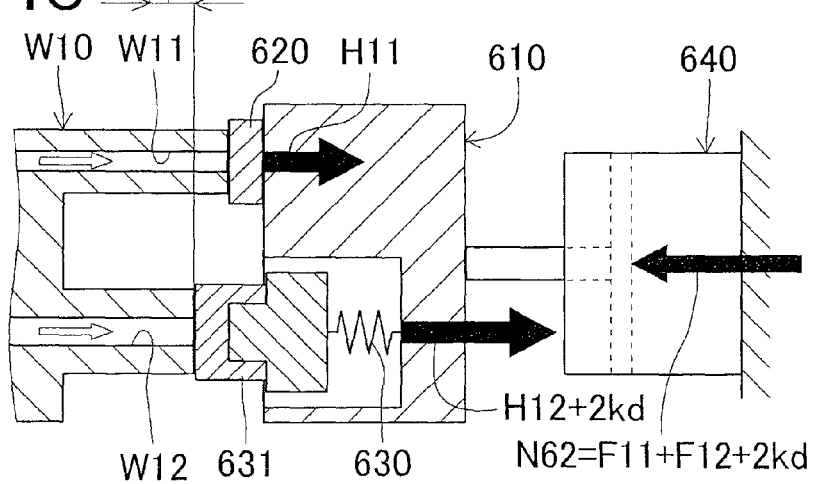
FIG. 14C is a sectional view of the structure when the second open portion is sealed by the spring according to related art, and shows the second open portion closer to the first open portion by the amount of the tolerance.
Figure 16:
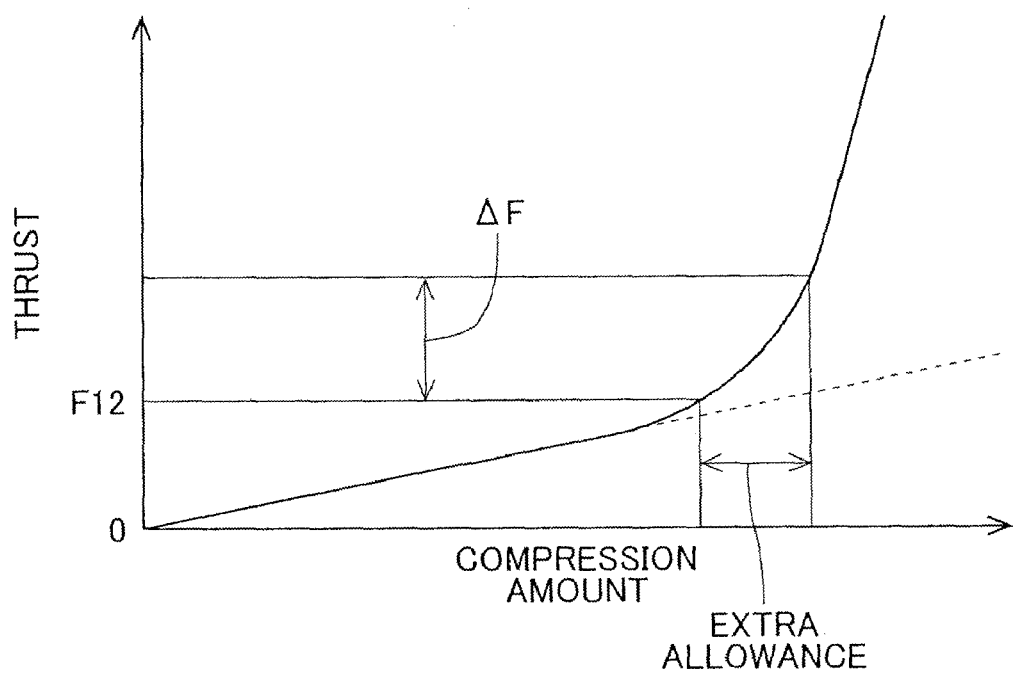
FIG. 16 is a view of a compression characteristic of the rubber member.

Here, when using individual cylinders or when sealing the inner open portion W22 using a spring as in the related art, the test fluid P22 is unable to be introduced into the inner open portion W22 due to this structure (see FIGS. 14 and 17).

Therefore, in the related art, the open portions W21 and W22 must be sealed using two fixed rubber members (see FIG. 15). In this case, a cylinder must be used that has thrust for absorbing the distance and thrust to overcome the extra allowance (i.e., the extra length of the rubber member), in addition to the leftward thrust N20 that is equal to the sum of the thrusts F21+F22 (see the thrusts N63 and N64 in FIG. 15).

That is, the leak test apparatus 101 is able to seal open portions that are unable to be sealed using a spring or individual cylinders, by sealing at least one of the open portions W21 and W22 that are formed in plurality on the right side surface of the workpiece W20, with the sliding unit 130. Accordingly, the leak test apparatus 101 is able to do away with the thrust for absorbing the distance and the thrust to overcome the extra allowance (i.e., the extra length of the rubber member), so the thrust of the cylinder 140 that is necessary when sealing an open portion is able to be greatly reduced.

Next, a leak test apparatus 201 according to a third example embodiment of the invention will be described.

Figure 7:
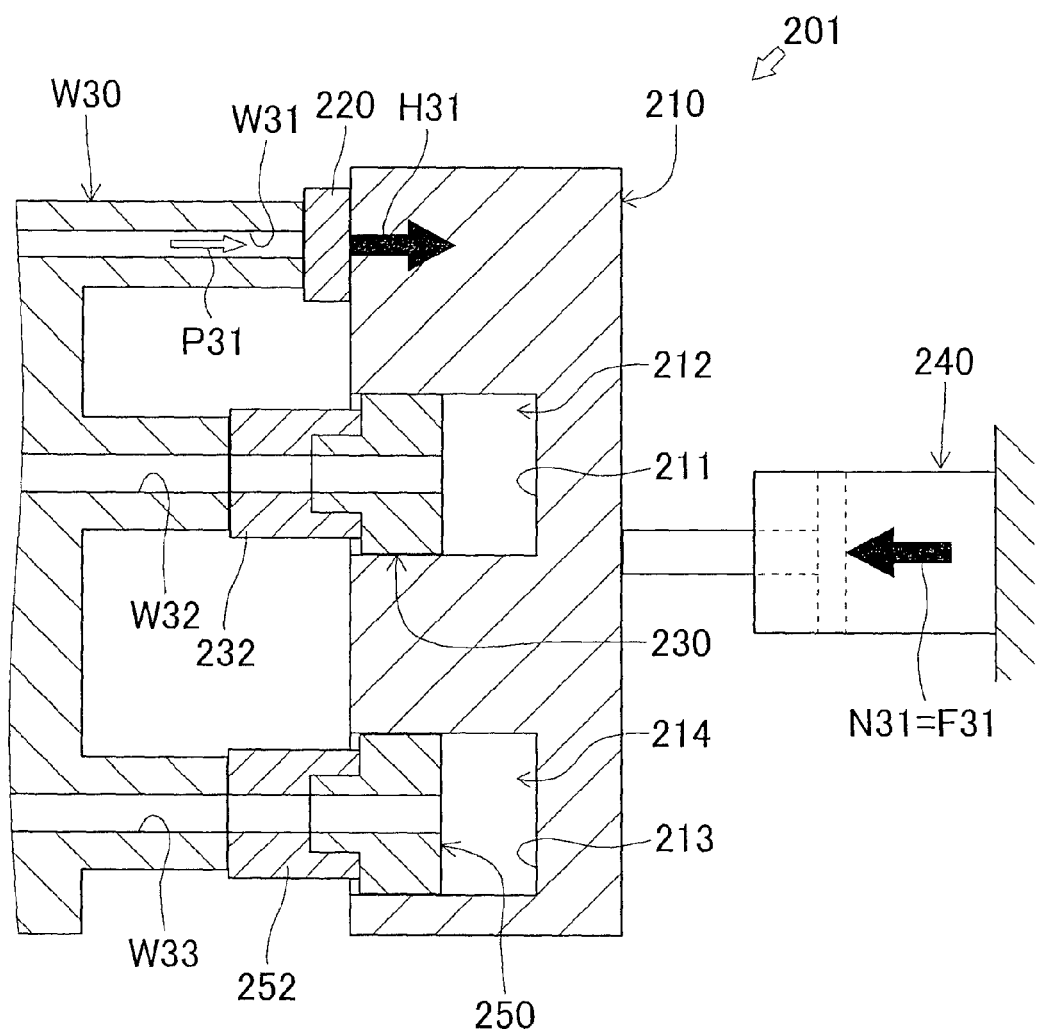
FIG. 7 is a view of a state in which a first open portion is sealed by a leak test apparatus according to a third example embodiment of the invention.
Figure 8:
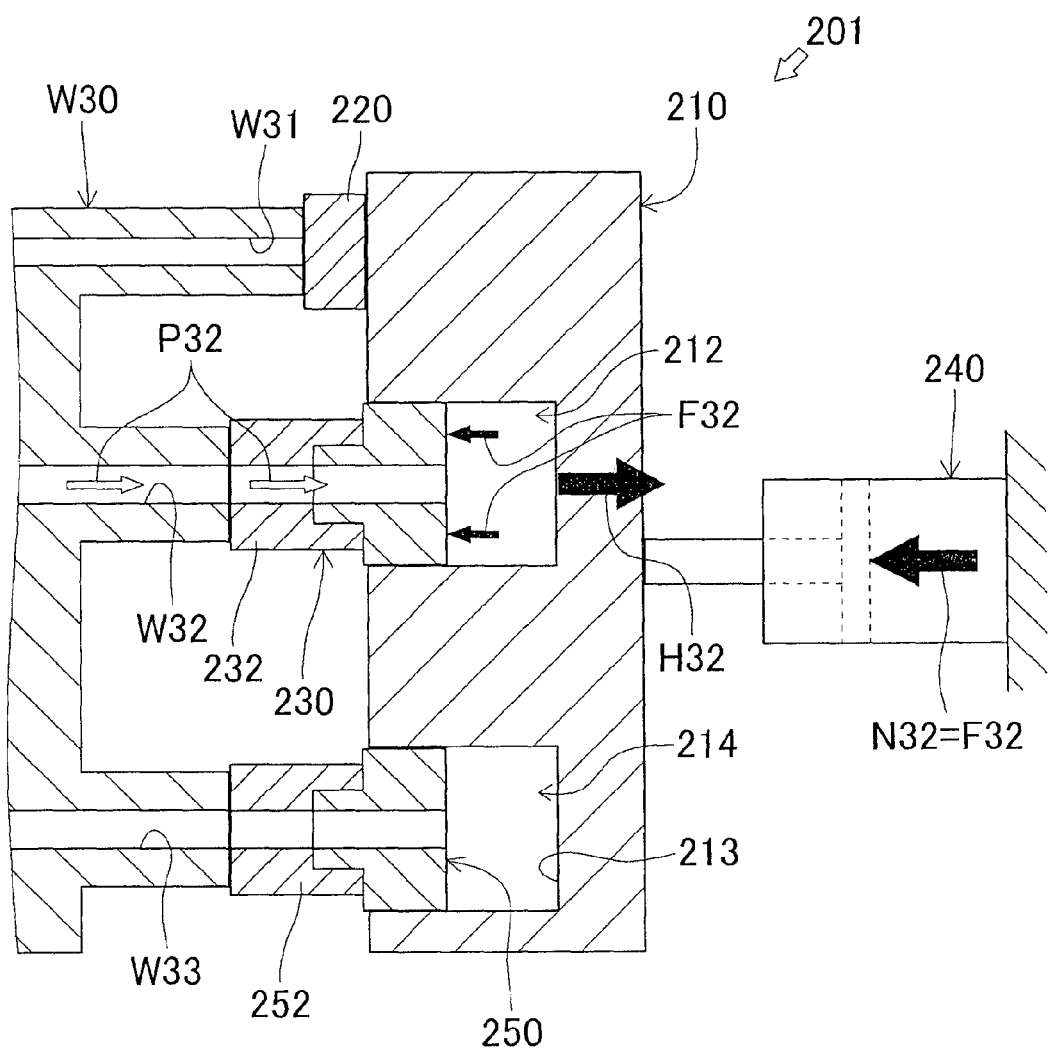
FIG. 8 is a view of a state in which a second open portion is sealed by the leak test apparatus according to the third example embodiment of the invention.
Figure 9:
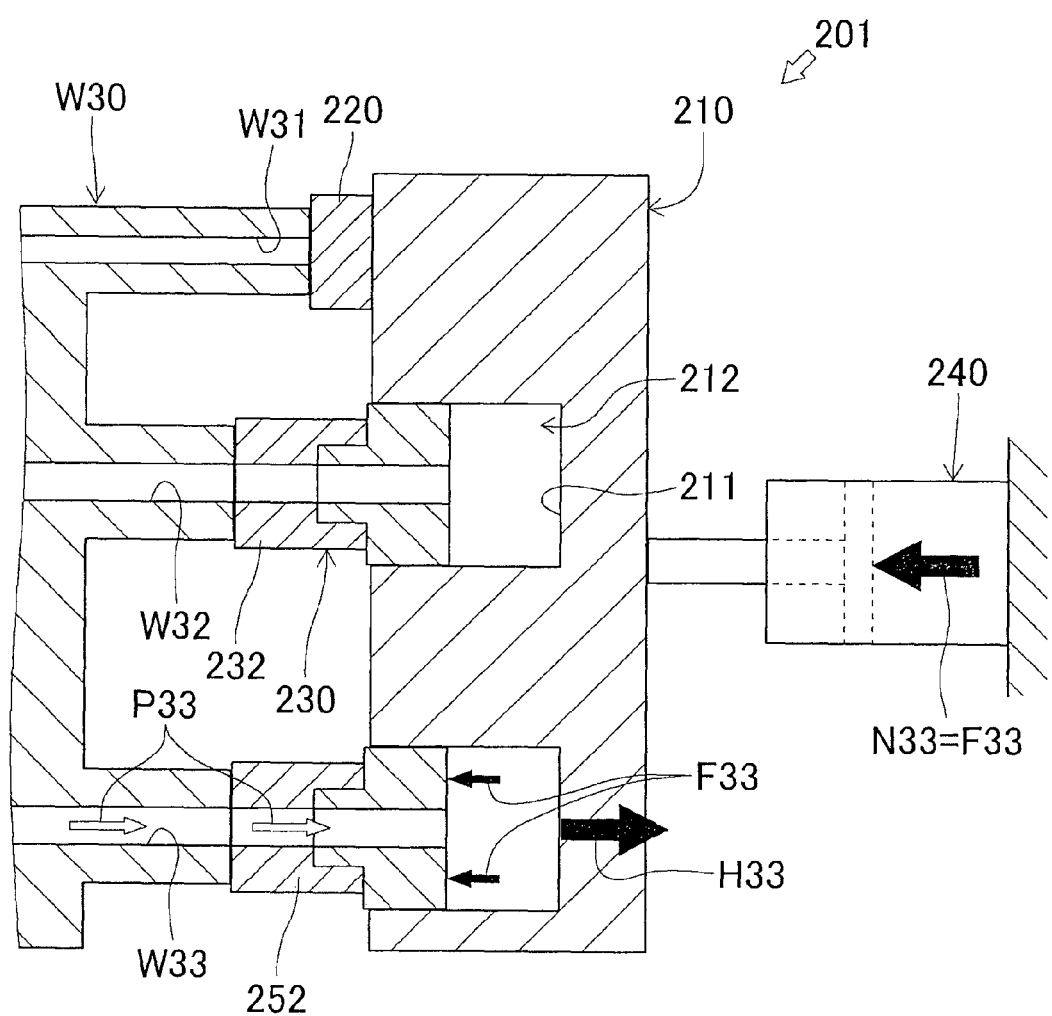
FIG. 9 is a view of a state in which a third open portion is sealed by the leak test apparatus according to the third example embodiment of the invention.

As shown in FIGS. 7 to 9, the leak test apparatus 201 of the third example embodiment differs from the leak test apparatus 1 of the first example embodiment in that it seals three open portions in order from a first open portion W31 to a third open portion W33.

As shown in FIG. 7, the first open portion W31 and the second open portion W32 are formed in generally the same shapes as the open portions W11 and W12 of the first example embodiment.

The third open portion W33 is arranged below the second open portion W32 and is formed in generally the same shape as the second open portion W32, and is also positioned in the same position as the second open portion W32 in the left-right direction. That is, the third open portion W33 is arranged in a position offset by a predetermined length to the left of the first open portion W31.

These kinds of open portions W31 to W33 are not communicated together inside the cylinder block. That is, the open portions W31 to W33 are individual systems.

The leak test apparatus 201 of the third example embodiment seals the first open portion W31 with a fixed rubber member 220, and seals the second open portion W32 and the third open portion W33 with sliding units 230 and 250.

A recessed portion 213 is formed below a recessed portion 211 in a plate 210. The recessed portion 213 is configured similar to the recessed portion 11 of the first example embodiment except for that it is arranged to the right of the third open portion W33.

The fixed rubber member 220 is configured similar to the fixed rubber member 20 of the first example embodiment.

The sliding unit 230 is configured similar to the sliding unit 30 of the first example embodiment.

The sliding unit 250 is configured similar to the sliding unit 30 of the first example embodiment, except for that it slides in the recessed portion 213.

That is, a pressure chamber 212 inside of which the sliding unit 230 is slidably inserted, and a pressure chamber 214 inside of which the sliding unit 250 is slidably inserted, are formed in the leak test apparatus 201.

In this way, the leak test apparatus 201 is configured to absorb the distances of the second open portion W32 and the third open portion W33 with respect to the first open portion W31, with the sliding amount of the sliding units 230 and 250, by sealing the second open portion W32 and the third open portion W33 that are arranged in the same position in the left-right direction, with the sliding units 230 and 250 (see FIG. 3).

Next, the operation of the leak test apparatus 201 according to the third example embodiment will be described.

Hereinafter, thrust necessary to seal the first open portion W31 will be designated F31, thrust necessary to seal the second open portion W32 will be designated F32, and thrust necessary to seal the third open portion W33 will be designated F33. Also, the thrusts F31 and F32 include reaction force generated during the test.

The leak test apparatus 201 drives a cylinder 240 to bring the plate 210 close to a workpiece W30, such that the fixed rubber member 220 and seal members 232 and 252 abut against the open portions W31 to W33.

Then, the leak test apparatus 201 pressurizes the system corresponding to the first open portion W31, and tests for a leak in the system corresponding to the first open portion W31.

That is, the cylinder 240 seals the first open portion W31 by generating leftward thrust and compressing the fixed rubber member 220 (see rightward reaction force H31 in FIG. 7). At this time, test fluids P32 and P33 (see FIGS. 8 and 9) are not introduced into the pressure chambers 212 and 214, so the sliding units 230 and 250 slide to the right in the recessed portions 211 and 213 by an amount corresponding to the compression amount of the fixed rubber member 220. That is, the seal members 232 and 252 are not compressed along with the fixed rubber member 220.

Accordingly, when testing the system corresponding to the first open portion W31, the cylinder 240 is able to seal the first open portion W31 simply by generating leftward thrust N31 that is equal to the thrust F31.

Next, the leak test apparatus 201 stops pressurizing the system corresponding to the first open portion W31, opens it up to the outside air, and tests for a leak in the system corresponding to the second open portion W32, as shown in FIG. 8.

That is, the leak test apparatus 201 introduces the test fluid P32 into the system corresponding to the second open portion W32. The leak test apparatus 201 seals the second open portion W32 by pushing the sliding unit 230 to the left with the pressure of the test fluid P32 from the pressure chamber 212 (see thrust F32 in FIG. 8). At this time, the sliding unit 230 moves relatively to the left with respect to the plate 210 (i.e., the fixed rubber member 220) and the sliding unit 250, by an amount corresponding to the compression amount of the seal member 232.

Therefore, when testing the system corresponding to the second open portion W32, the cylinder 240 is able to seal the second open portion W32 simply by generating leftward thrust N32 that is equal to the thrust F32 (see the thrust F32 and the rightward reaction force H32 in FIG. 8). This is also the same when sealing the third open portion W33 (see the test fluid P33, the thrust F33, rightward reaction force H33, and thrust N33 in FIG. 9).

In this way, the leak test apparatus 201 is able to selectively seal each of the open portions W31 to W33 by sealing the second open portion W32 and the third open portion W33 with the sliding units 230 and 250.

Accordingly, the leak test apparatus 201 is able to reduce the thrust of the cylinder 240 needed when sealing an open portion. More specifically, the leak test apparatus 201 is able to reduce the thrust of the cylinder 240 to a thrust that is equal to the maximum value of the thrusts F31 to F33.

The leak test apparatus 201 is able to selectively seal each of the open portions even when the open portions are sealed by three sliding units. That is, the leak test apparatus 201 is able to selectively seal each open portion when detecting a leak in the open portion for each system, by sealing all of the open portions with the sliding units, or by sealing the open portions, excluding the open portion corresponding to one system, with the sliding units.

Next, a leak test apparatus 301 according to a fourth example embodiment of the invention will be described.

Figure 10A:
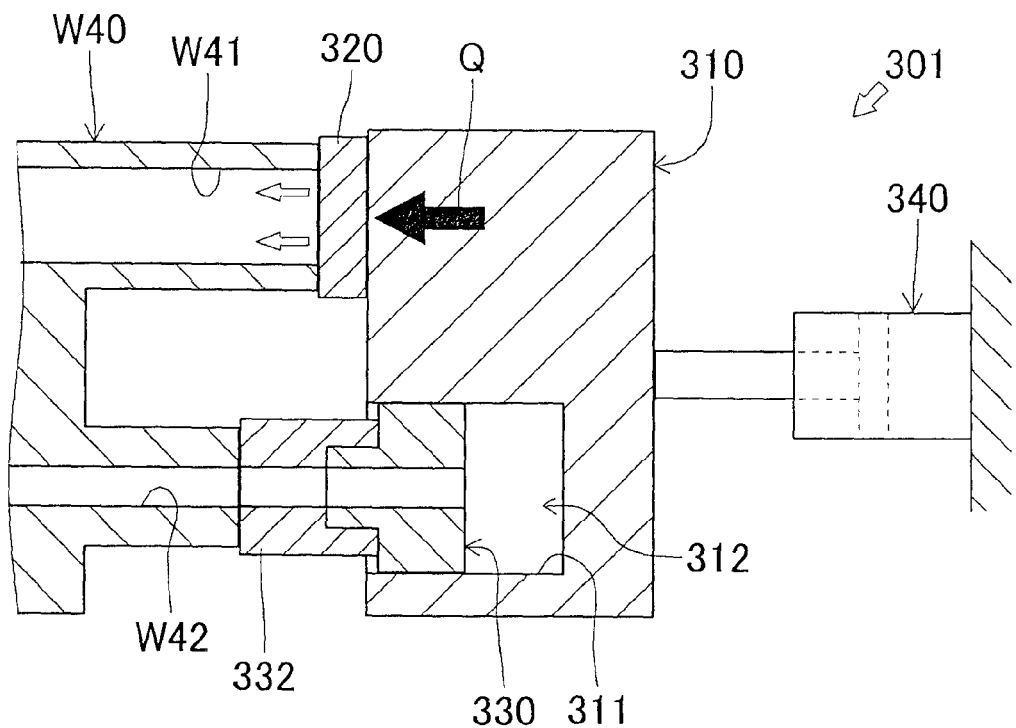
FIG. 10A is a view of the operation of a leak test apparatus according to a fourth example embodiment of the invention, and shows a state in which a first open portion is sealed.
Figure 10B:
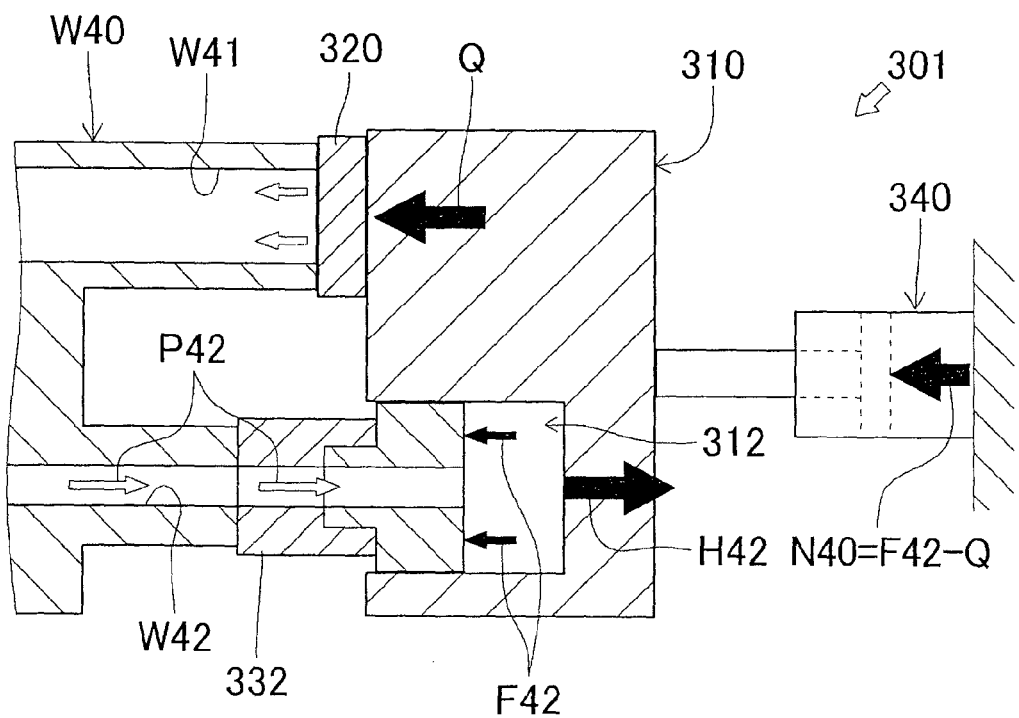
FIG. 10B is a view of the operation of the leak test apparatus according to the fourth example embodiment of the invention, and shows a state in which a second open portion is sealed.

As shown in FIGS. 10A and 10B, the leak test apparatus 301 according to the fourth example embodiment differs from the leak test apparatus 1 according to the first example embodiment in that a first open portion W41 on which a negative pressure test is to be performed, and a second open portion W42 on which a positive pressure test is to be performed, are sealed in order.

The first open portion W41 is configured similar to the first open portion W11 of the first example embodiment except for that the inner diameter dimension thereof is larger than an inner diameter dimension of the first open portion W11 of the first example embodiment.

The second open portion W42 is configured similar to the second open portion W12 of the first example embodiment.

These kinds of open portions W41 and W42 are not communicated together inside of the cylinder block. That is, the open portions W41 and W42 are separate systems.

The leak test apparatus 301 according to the fourth example embodiment seals the first open portion W41 with a fixed rubber member 320, and seals the second open portion W42 with a sliding unit 330.

The fixed rubber member 320 is configured similar to the fixed rubber member 20 of the first example embodiment except in that it is formed in a shape able to seal the first open portion W41.

The sliding unit 330 is configured similar to the sliding unit 30 of the first example embodiment.

Next, the operation of the leak test apparatus 301 according to the fourth example embodiment will be described.

Hereinafter, the thrust required to seal the second open portion W42 will be designated F42. Also, this thrust F42 includes reaction force generated during the test.

As shown in FIG. 10A, the leak test apparatus 301 drives a cylinder 340 to bring a plate 310 close to the workpiece W40, such that the fixed rubber member 320 and a seal member 332 abut against the open portions W41 and W42.

Then, the leak test apparatus 301 depressurizes the system corresponding to the first open portion W41, and tests for a leak in the system corresponding to the first open portion W41.

At this time, the plate 310 is drawn (i.e., sucked) by the first open portion W41, such that the fixed rubber member 320 is suctioned to the first open portion W41. Also, test fluid P42 is not introduced into a pressure chamber 312, so the sliding unit 330 slides to the right in a recessed portion 311 according to the deformation amount from the suction of the fixed rubber member 320. That is, the seal member 332 is not compressed during the negative pressure test.

Therefore, when testing the system corresponding to the first open portion W41, the leak test apparatus 301 is able to seal the first open portion W41 with only suction Q from the reduced pressure. Therefore, when testing the system corresponding to the first open portion W41, the cylinder 340 is not driven.

Next, the leak test apparatus 301 tests for a leak in the system corresponding to the second open portion W42, as shown in FIG. 10B.

That is, the leak test apparatus 301 introduces the test fluid P42 into the system corresponding to the second open portion W42. The sliding unit 330 is pushed to the left by the pressure of the test fluid P42 from the pressure chamber 312, thereby sealing the second open portion W42 (see the thrust F42 in FIG. 10B).

The leak test apparatus 301 tests for a leak in the system corresponding to the second open portion W42 in this way, while the system corresponding to the first open portion W41 is kept depressurized.

Accordingly, when sealing the second open portion W42, the leak test apparatus 301 is able to counteract reaction force H42 to the right that acts on the plate 310, with the suction Q. Therefore, the cylinder 340 is able to seal the second open portion W42 simply by generating leftward thrust N40 that is equal to the difference of the thrust F42 minus the suction Q.

If the amount of suction Q is equal to or greater than the thrust F42, the leak test apparatus 301 does not need to drive the cylinder 340 when sealing the second open portion W42. That is, in this case, the cylinder 340 need only be able to generate enough thrust to be able to move the plate 310.

In this way, when performing the negative pressure test and the positive pressure test, the leak test apparatus 301 is able to effectively reduce the thrust of the cylinder 340, by sealing the second open portion W42 on which the positive pressure test is performed, with the sliding unit 330, while maintaining the suction Q during the negative pressure test. Accordingly, when testing the workpiece 40 on which the positive pressure test and the negative pressure test are to be performed as they are with a cylinder head, the leak test apparatus 301 is able to effectively reduce the thrust of the cylinder 340 that is required when sealing an open portion. In particular, when the amount of the suction Q is equal to or greater than the thrust F42, the leak test apparatus 301 is able to reduce the thrust of the cylinder 340 to a thrust that is able to move the plate 310.

Next, a leak test apparatus 401 according to a fifth example embodiment of the invention will be described.

Figure 11A:
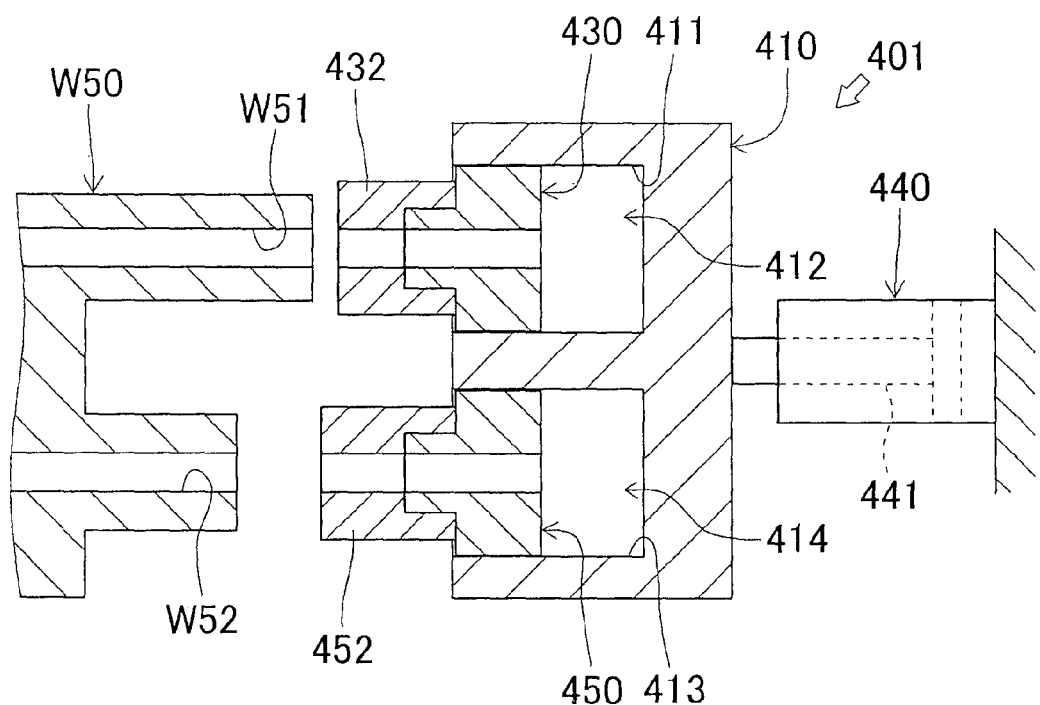
FIG. 11A is a view of the operation of a leak test apparatus according to a fifth example embodiment of the invention, and shows the overall structure.
Figure 11B:
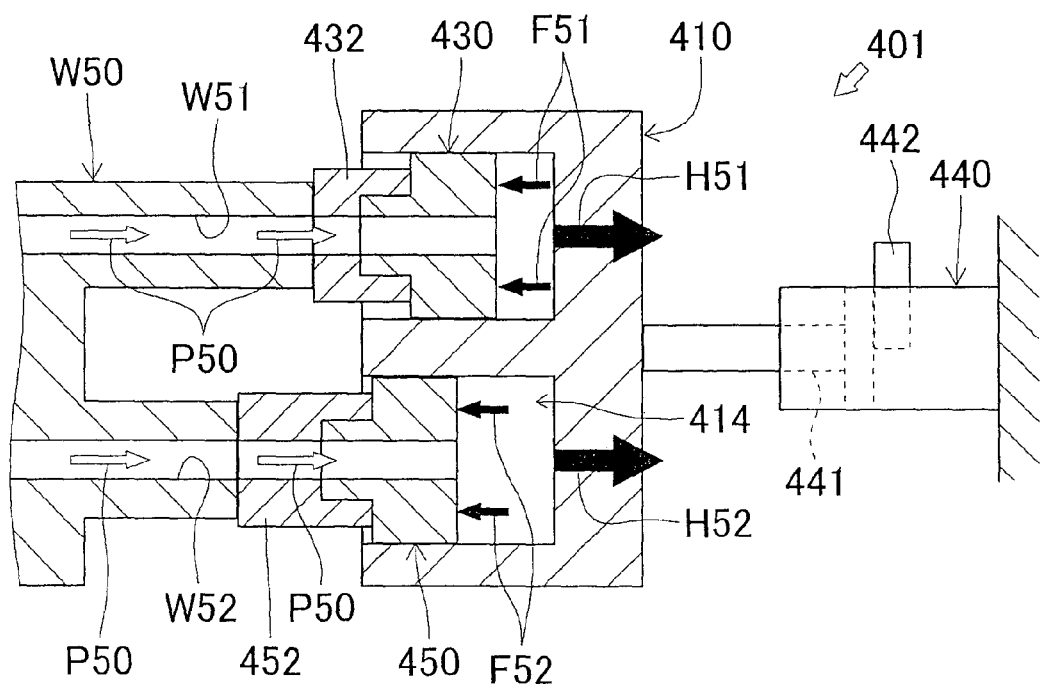
FIG. 11B is a view of the operation of the leak test apparatus according to the fifth example embodiment of the invention, and shows a state in which open portions are sealed.

As shown in FIGS. 11A and 11B, the leak test apparatus 401 according to the fifth example embodiment differs from the leak test apparatus 1 according to the first example embodiment in that a lock cylinder is employed as a cylinder 440, and open portions W51 and W52 are both sealed by sliding units 430 and 450.

The open portions W51 and W52 are formed in generally the same shape as the open portions W11 and W12 of the first example embodiment.

Recessed portions 411 and 413 are formed in a plate 410. The recessed portion 411 is configured similar to the recessed portion 11 of the first example embodiment, except for that it is arranged to the right of the first open portion W51. The recessed portion 413 is configured similar to the recessed portion 11 of the first example embodiment.

The sliding unit 430 is configured similar to the sliding unit 30 of the first example embodiment, except for that it slides in the recessed portion 411.

The sliding unit 450 is configured similar to the sliding unit 30 of the first example embodiment.

That is, a pressure chamber 412 into which the sliding unit 430 is slidably inserted, and a pressure chamber 414 into which the sliding unit 450 is slidably inserted, are formed in the leak test apparatus 401.

Next, the operation of the leak test apparatus 401 according to the fifth example embodiment will be described.

Hereinafter, thrust necessary to seal the first open portion W51 will be designated F51, and thrust necessary to seal the second open portion W52 will be designated F52. Also, the thrusts F51 and F52 include reaction force generated during the test.

As shown in FIG. 11A, the leak test apparatus 401 drives the cylinder 440 to bring the plate 410 close to a workpiece W50, such that seal members 432 and 452 abut against the open portions W51 and W52. Then, as shown in FIG. 11B, the leak test apparatus 401 locks a rod 441 of the cylinder 440 so that it will not move to the right (see lock 442 in FIG. 11B).

After locking the rod 441 of the cylinder 440, the leak test apparatus 401 introduces a test fluid P50 into the workpiece W50. Then the sliding units 430 and 450 are pushed to the left by the pressure of the test fluid P50 from the pressure chambers 412 and 414, thereby sealing the open portions W51 and W52 (see thrusts F51 and F52 in FIG. 11B).

Accordingly, when sealing the open portions W51 and W52, the leak test apparatus 401 is able to receive reaction forces H51 and H52 to the right that act on the plate 410, with the lock 442.

Therefore, when sealing the open portions W51 and W52, the leak test apparatus 401 does not need to drive the cylinder 440. That is, the leak test apparatus 401 is able to reduce the thrust of the cylinder 440 to a thrust that is able to move the plate 410.

In this way, the cylinder 440 is a lock cylinder that includes the rod 441 that is connected at a left end portion thereof to the plate 410, and that is able to lock the rod 441 in a predetermined position. Also, the leak test apparatus 401 seals both of the open portions W51 and W52 with the sliding units 430 and 450.

As shown in FIGS. 12A and 12B, when the cylinder 440 is a lock cylinder, the leak test apparatus 401 does not need to drive the cylinder 440 when sealing the first open portion W51, when only the first open portion W51 is formed on the right side surface (i.e., when only one open portion is formed on one side surface) of the workpiece W50. That is, the leak test apparatus 401 is able to reduce the thrust of the cylinder 440 to a thrust that is able to move the plate 410.

Also, the leak test apparatus may also be configured such that the sliding unit 30 is standardized for each pressure receiving area A, and is attached to the plate 510 via a generally cylindrical connecting member 51 in which a flange portion is formed on a right end portion thereof, as shown in FIG. 13 (see units 50A and 50B in FIG. 13).

Accordingly, the leak test apparatus is able to select the units 50A and 50B from the thrust required to seal the open portion, so the design process is able to be shortened. Also, the cost of the leak test apparatus is able to be reduced, and the leak test apparatus is able to be easily expanded to existing equipment.

The invention claimed is:

1. A leak test apparatus that tests for a leak in a workpiece by sealing an open portion formed on one side surface of the workpiece, comprising:
 a plate;
 a seal that moves relative to the plate and is supported by the plate;

a driving portion that supports the plate and moves the plate; and a pressure chamber that is surrounded by the plate and the seal, wherein the seal is formed in a shape that enables the pressure chamber to be communicated with an outside of the seal;

the seal is formed in a shape that enables the open portion to be communicated with the pressure chamber;

the pressure chamber is configured such that test fluid from the workpiece is introduced into the pressure chamber via the seal; and the seal is pushed by a pressure of the test fluid from the pressure chamber, and seals the open portion, and the leak test apparatus thereby is configured to detect a leakage amount of the workpiece after the pressure of the test fluid pushes the seal.

2. The leak test apparatus according to claim 1, wherein
the plate is arranged on a side facing the one side surface of the workpiece;

the seal is able to move with respect to the plate in a direction with respect to the workpiece;

the seal is supported on a side of the plate that faces the one side surface of the workpiece;

the driving portion moves the plate and the seal with respect to the workpiece;

the pressure chamber is configured such that the seal is slidably inserted therein;

the driving portion brings the plate toward the workpiece until the seal abuts against the open portion.

3. The leak test apparatus according to claim 1, wherein a plurality of the open portions are formed on the one side surface of the workpiece, and the leak test apparatus seals at least one of the open portions with the seal.

4. The leak test apparatus according to claim 3, wherein at least two open portions in which positions of portions thereof to be sealed differ in a direction with respect to the plate are formed on the workpiece.

5. The leak test apparatus according to claim 3, wherein
the driving portion is a lock cylinder that is provided with a rod that is connected at one end portion to the plate, and that is able to lock the rod in a predetermined position; and the leak test apparatus seals all of the open portions with the seal.

6. The leak test apparatus according to claim 1, wherein
only one of the open portions is formed on the one side surface of the workpiece; and the driving portion is a lock cylinder that is provided with a rod that is connected at one end portion to the plate, and that is able to lock the rod in a predetermined position.

7. A leak test method used by a leak test apparatus that tests for a leak in a workpiece by sealing an open portion formed on one side surface of the workpiece, the leak test apparatus including
a plate that is arranged on a side facing the one side surface of the workpiece;

a seal that moves relative to the plate in a direction with respect to the workpiece, and is supported by a side of the plate that faces the one side surface of the workpiece;

a driving portion that supports the plate and moves the plate and the seal with respect to the workpiece; and a pressure chamber inside of which the seal is slidably inserted, the seal being formed in a shape that enables the open portion of the workpiece to be communicated with the pressure chamber, the leak test method comprising:

driving the driving portion;

bringing the plate toward the workpiece until the seal abuts against the open portion;

introducing test fluid into the pressure chamber via the seal when the test fluid is introduced into the workpiece; and pushing the seal with a pressure of the test fluid from the pressure chamber; and detecting a leakage amount of the workpiece after the pushing of the seal with the pressure of the test fluid.

8. The leak test apparatus according to claim 1, wherein the pressure chamber is formed by a gap between the plate and at least an end face of the seal.

9. The leak test apparatus according to claim 1, wherein the seal moves in, at least, a direction away from the plate when sealing the open portion.

\* \* \* \* \*